United States Patent
Tojo et al.

(10) Patent No.: US 7,034,865 B2
(45) Date of Patent: Apr. 25, 2006

(54) MEDIA PACK, PRINTER, AND CAMERA WITH PRINTER

(75) Inventors: Akihiko Tojo, Kanagawa (JP); Koji Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 09/950,743

(22) Filed: Sep. 12, 2001

(65) Prior Publication Data

US 2002/0036802 A1   Mar. 28, 2002

(30) Foreign Application Priority Data

| Sep. 12, 2000 | (JP) | ............................. 2000-277368 |
| Sep. 12, 2000 | (JP) | ............................. 2000-277370 |
| Sep. 6, 2001  | (JP) | ............................. 2001-270220 |

(51) Int. Cl.
| H04N 5/225 | (2006.01) |
| H04N 5/228 | (2006.01) |
| B41J 3/00  | (2006.01) |
| B41J 2/175 | (2006.01) |
| B41J 3/407 | (2006.01) |
| B41J 3/36  | (2006.01) |

(52) U.S. Cl. .............................. 348/207.2; 348/208.2; 347/2; 347/86; 347/106; 347/109

(58) Field of Classification Search ............ 348/207.2, 348/208.99, 208.2, 552, 231.3, 231.5, 231.6, 348/231.7; 396/30, 208; 347/16, 101, 108, 347/109, 2, 14, 19, 86, 106; 358/1.9; 271/145
See application file for complete search history.

(56) References Cited

U.S. PATENT DOCUMENTS

| 5,999,203 | A | 12/1999 | Cane et al. ................. 347/171 |
| 6,067,418 | A | 5/2000 | Sato |
| 6,196,670 | B1 * | 3/2001 | Saruta ........................ 347/86 |
| 6,243,538 | B1 * | 6/2001 | Okuno ....................... 396/321 |
| 6,523,933 | B1 * | 2/2003 | Hirano et al. ................. 347/36 |
| 6,577,818 | B1 * | 6/2003 | Hirano ........................ 396/30 |
| 6,584,290 | B1 * | 6/2003 | Kurz et al. ................... 399/12 |
| 6,655,776 | B1 * | 12/2003 | Murray ....................... 347/19 |
| 6,658,219 | B1 * | 12/2003 | Ito et al. ...................... 399/27 |
| 6,722,753 | B1 * | 4/2004 | Helterline et al. ............ 347/19 |
| 6,771,308 | B1 * | 8/2004 | Yamamoto et al. ....... 348/207.2 |
| 2002/0044198 | A1 * | 4/2002 | Miyazaki .................... 347/248 |
| 2004/0125209 | A1 * | 7/2004 | Silverbrook et al. ..... 348/207.2 |
| 2005/0146616 | A1 * | 7/2005 | Parulski et al. .......... 348/207.2 |

FOREIGN PATENT DOCUMENTS

| DE | 19942900 A1   | 5/2000 |
| EP | 0 985 537 A1  | 3/2000 |
| EP |   985537 A1 * | 3/2000 |

(Continued)

*Primary Examiner*—Ngoc-Yen Yu
*Assistant Examiner*—Justin Misleh
(74) *Attorney, Agent, or Firm*—Morgan & Finnegan, L.L.P.

(57) ABSTRACT

There is provided a media pack which can be removably mounted in a printer, and which allows a consumable article or articles contained therein for use by the printer, and enables the printer to easily recognize whether there is a possibility of degradation of the consumable article(s) due to a long time period elapsing after filling or producing of the consumable article(s). A pack body contains ink and a print medium for use by the printer, and a memory is arranged within the pack body, for having readably written therein data related to the print medium, which includes at least information of a year and month at which the print medium was filled or produced.

4 Claims, 21 Drawing Sheets

FOREIGN PATENT DOCUMENTS

| | | |
|---|---|---|
| EP | 1 000 752 A2 | 5/2000 |
| EP | 1 004 4446 A2 | 5/2000 |
| EP | 1000752 A2 * | 5/2000 |
| EP | 1004446 A2 * | 5/2000 |
| EP | 1088667 A1 * | 4/2001 |
| JP | 11254700 | 9/1999 |
| JP | 2001331069 A * | 11/2001 |
| JP | 2003084513 A * | 3/2003 |

* cited by examiner

MEDIA PACK, PRINTER, AND CAMERA WITH PRINTER

BACKGROUND OF THE INVENTION

1. Field of the Invention

This invention relates to a media pack that can be removably mounted in a printer, a printer and a camera with the printer that can removably receive the media pack.

2. Prior Art

In general, in order to form an image with an excellent picture quality on a recording surface of a recording medium by an ink jet recording apparatus, it is required to use ink, which is suited to a kind of the recording medium, for example. To meet this requirement, a media pack which can be removably mounted in the body of a recording apparatus was disclosed e.g. in Japanese Laid-Open Patent Publication (Kokai) No. 11-254700 (where the media pack is referred to as a media cartridge). The use of the media pack or media cartridge makes it possible to positively provide ink suitable for use on the recording medium.

The media cartridge is comprised of a cassette section in which a stack of a plurality of recording medium sheets are contained, an ink tank section for holding ink suitable for recording on the recording medium sheets, and a waste ink tank section for collecting and holding used ink which has been used in a recovery process for a recording head. The media cartridge is replaced by a new one when the recording medium sheets and/or the ink held therein are used up. Also, when recording medium sheets of a different kind are required to be used, the media cartridge is replaced by another media cartridge holding the desired kind of recording medium sheets and ink suitable for the recording medium sheets.

However, when the above conventional type of media cartridge is used, it is required to change the media cartridge each time recording medium sheets and/or ink held in the media cartridge are used up, which results in higher running costs than when a media cartridge can be refilled with recording medium sheets and/or ink.

Further, when it is required to use a plurality of media cartridges each holding a different kind of recording medium sheets and ink while replacing them with each other, some media cartridges can be left unused over a long time period. Recording medium sheets and/or ink in a media cartridge purchased long ago can have changed in quality and deteriorated to such an extent that they are no longer suitable for use. However, a user might use the media cartridge without being aware of the fact that the media cartridge was purchased long ago. Deterioration of recording medium sheets and/or ink in the media cartridge makes it impossible to output an image with a desired picture quality, which causes the inconvenience that the user has to perform printing again by using a new media cartridge.

Further, a camera with a printer is conventionally known, which is capable of storing in its memory information related to an image picked up by an electronic imaging means, such as a CCD, and printing out image information at any time.

In general, a fusion thermal transfer printer, a sublimation thermal transfer printer or an ink jet printer can be used for the camera of the above kind. Among these printers, the ink jet printer is most advantageous in terms of running costs, reduction of the size, power management, and output speed, and hence particularly suitable for a camera of a camera-printer combination type of which portability is required.

In the above combination-type camera with a printer, it is preferred that an image picked up by the camera is printed in a state of the camera being placed on a horizontal or level support surface, but printing is possible even when the camera is being carried so long as the camera is held in a predetermined state. However, e.g. when a photographer is moving with the camera in his/her hands, the camera is shaken up and down or left and right, together with the printer incorporated in the camera. When printing is performed in the state of the camera being shaken up and down or left and right, if a big shake occurs, the print operation of the printer is hindered, which makes it impossible to obtain a desired print output. As a result, a print output comes to nothing.

Further, the photographer cannot make a determination as to the degree or magnitude of a shake which is tolerable for print operation, which degrades the ease of use of the combination-type camera.

SUMMARY OF THE INVENTION

It is a first object of the present invention to provide a media pack which can be removably mounted in a printer, and which allows a consumable article or articles contained therein for use by the printer to be refilled, and enables the printer to easily recognize whether there is a possibility of degradation of the consumable article(s) due to a long time period elapsing after refilling of the consumable article(s).

It is a second object of the present invention to provide a printer and a camera with a printer which make it possible to easily recognize whether there is a possibility of degradation of the consumable article(s) of a media pack due to a long time period elapsing after refilling of the consumable article(s), when the media pack is used.

It is a third object of the present invention to provide a media pack which can be used for time-related management of information related to operations of a printer.

It is a fourth object of the present invention to provide a printer and a camera with a printer which are capable of performing time-related management of information related to operations of the printer by using a memory arranged in a media pack when the media pack is used.

It is a fifth object of the present invention to provide a camera with a printer which enables timerelated management of a media pack mounted therein by utilizing clock information for recording a date and time in association with an image during image recording by a camera.

It is a sixth object of the present invention to provide a media pack which makes it possible to read characteristic change information indicative of a change in characteristics of a consumable article or articles of a media pack, to thereby enable easy recognition of the change in characteristics of the consumable article(s).

It is a seventh object of the present invention to provide a printer which is capable of easily recognizing a change in characteristics of a consumable article or articles of a media pack when the media pack is used.

It is an eighth object of the present invention to provide a camera with a printer which is capable of optimally controlling a print operation performed in a condition where a blur can occur, and which is easy for a user to handle, and enables reduction of the size of the whole apparatus through sharing a single sensor for a shake sensor for the camera and a blur sensor for controlling printing by the printer.

To attain the first object, according to a first aspect of the invention, there is provided a media pack that can be removably mounted in a printer, the media pack comprising a pack body containing at least ink and a print medium for use with the printer, and a memory arranged within the pack body, for storing data related to the at least ink and a print medium, the data including at least first information of a year and month at which at least ink and a print medium was filled or produced.

This arrangement not only allows the media pack to be refilled with the consumable article for use by the printer, but also enables the printer to easily recognize whether there is a possibility of degradation of the consumable article due to a long time period having elapsed after refilling of the consumable article.

Preferably, the first information is updated when the media pack is refilled with the print medium.

Preferably, the memory also stores second information of a year and month at which the ink was filled or produced.

Preferably, the first information is stored in association with the second information.

Preferably, the memory stores third information relating to a change in characteristics of the ink dependent on a time period elapsed after the filling or producing of the ink.

According to this preferred embodiment, the printer reads third information stored in the memory, whereby the compensation for the degradation of the ink can be easily filled or produced.

To attain the second object, according to a second aspect of the invention, there is provided a printer comprising a mounting mechanism capable of removably mounting a media pack comprising a pack body containing ink and a print medium for use in printing, and a memory capable of storing data related to the print medium, the data including at least first information of a year and month at which print medium was filled or produced, and a detector capable of detecting an elapsed time period based on the first information read out from the memory.

According to this printer, when using the media pack, it is possible to easily determine whether or not there is a possibility of degradation of the consumable article due to a long elapsed time period.

Preferably, the memory also stores second information of a year and month at which the ink was filled or produced, and the printer includes an acquisition circuit capable of acquiring characteristic change third information relating to a change in characteristics of the ink dependent on a time period elapsed after the filling or producing of the ink.

Preferably, the third information is stored in the memory of the media pack.

Preferably, the third information is stored in a memory.

Preferably, the printer further includes an image processing circuit capable of executing image processing of image data, by using coefficients, and a coefficient-changing circuit capable of changing the coefficients used in the image processing, based on the third information.

According to this preferred embodiment, the compensation for degradation of the ink can be easily carried out.

To attain the second object, according to a third aspect of the invention, there is provided a printer comprising a mounting mechanism capable of removably mounting a media pack at least one kind of containing consumable article and including a memory capable of storing at least first information of a year and month at which the consumable article was filled or produced, a mode setting circuit capable of setting a print mode for performing a print operation, and a detector capable of detecting an elapsed time period based on the first information, when the media pack is mounted in the mounting mechanism and when the print mode is set.

According to this printer, when using a media pack, it is possible to easily determine whether or not there is a possibility of degradation of the consumable article due to a long time period having elapsed after the filling or production of the consumable article.

Preferably, the printer further includes a display capable of displaying a result of detection performed by the detector when the media pack is mounted, in a first display form, and displaying a result of detection performed by the detector when the print mode is set, in a second display form different from the first display form.

According to this preferred embodiment, it is possible to carry out warning of degradation of the consumable article in a user-friendly manner.

To attain the second object, according to a fourth aspect of the invention, there is provided a camera with a printer, comprising a printer, an image sensor capable of picking up an image, a timer capable of setting date information, a recorder capable of recording the image picked up by the image sensor, in association with the date information set by the timer, a mounting mechanism capable of removably mounting a media pack containing at least one kind of consumable article for use in printing by the printer and including a memory capable of storing at least first information of a year and month at which the consumable article was filled or produced, and a detector capable of detecting a time period elapsed after the filling or producing of the consumable article, based on the first information stored in the memory and the date information set by the timer.

According to this camera with a printer, it is possible to determine easily whether or not there is a possibility of degradation of the consumable article due to a long elapsed time period.

Preferably, the camera with a printer includes an acquisition circuit capable of acquiring third information relating to a change in characteristics of the consumable articles dependent on a time period elapsed after the filling or producing of the consumable article.

Preferably, the third information is stored in the memory of the media pack.

Preferably, the third information is stored in a memory.

Preferably, the camera with a printer includes an image processing circuit capable of executing image processing of image data, by using coefficients, and a coefficient-changing circuit capable of changing the coefficients used in the image processing, based on the acquired third information.

According to this preferred embodiment, compensation for the degradation of the consumable article can be easily carried out.

Preferably, the camera with a printer includes a mode setting circuit capable of setting a print mode for performing a print operation, and the detector detects a time period elapsed after the filling or producing of the consumable articles when the media pack is mounted in the mounting means and when the print mode is set.

Preferably, the camera with a printer includes a display capable of displaying a result of detection performed by the detector when the media pack is mounted, in a first display form, and displays a result of detection performed by the detector when the print mode is set, in a second display form different from the first display form.

According to this preferred embodiment, it is possible to carry out warning of degradation of the consumable article(s) in a user-friendly manner.

To attain the third object, according to a fifth aspect of the invention, there is provided a media pack that can be removably mounted in a printer, the media pack comprising a pack body containing at least one kind of consumable article for use by the printer, and a memory arranged within the pack body, the memory being capable of storing information relating to operations of the printer in association with date information at least in a state of the media pack being mounted in the printer.

According to this media pack, it is possible to utilize the media pack for time-related management of the information related to operations of the printer.

To attain the fourth object, according to a sixth aspect of the invention, there is provided a printer comprising a mounting mechanism capable of mounting a media pack containing at least one kind of consumable article, and printing means capable of performing a print operation by using the consumable article contained in the media pack, the media pack including a pack body containing the consumable article, and a memory arranged within the pack body, the memory being capable of storing information relating to the print operation in association with date information at least in a state of the media pack being mounted in the mounting mechanism, the information wherein relating to the print operation including error information of an error in the print operation.

According to this printer, when the media pack is used, it is possible to perform time-related management of the information related to operations of the printer by using the memory arranged in the media pack.

Preferably, the camera with a printer comprises a connector for connecting the printer to the camera.

According to this camera with a printer, when the media pack is used, it is possible to perform time-related management of the information related to operations of the printer by using the memory arranged in the media pack.

To attain the fifth object, according to a seventh aspect of the invention, there is provided a camera with a printer, comprising a printer, an image sensor capable of picking up an image, a timer capable of setting date information, a recorder capable of recording the image picked up by the image sensor, in association with the date information set by the timer, a mounting mechanism capable of removably mounting a media pack containing consumable articles for use in printing by the printer and including a memory capable of storing, and a controller that writes the date information set by the timer, in the memory of the media pack.

According to this camera with a printer, date information for use in recording a date and time in association with an image during image recording by the camera can be utilized for time-related management of the media pack.

Preferably, the at least one kind of consumable article contained in the media pack comprises ink and/or a print medium.

Preferably, the memory of the media pack further stores information related to the consumable articles.

Preferably, the controller writes the date information set by the timer and the information related to operations of the printer in association with each other in the memory of the media pack.

To attain the sixth object, according to an eighth aspect of the invention, there is provided a media pack which can be removably mounted in a printer, the media pack comprising a pack body containing at least one kind of consumable article for use by the printer, and a memory arranged within the pack body, the memory being capable of storing data related to information indicative of a change in characteristics of the consumable article dependent on a time period elapsed after the filling or producing of the consumable article.

According to this media pack, it is possible to read the characteristic change information indicative of a change in characteristics of the consumable article, thereby easily recognizing the change in characteristics of the consumable articles.

To attain the seventh object, according to a ninth aspect of the invention, there is provided a printer comprising a mounting mechanism capable of mounting a media pack including a pack body containing at least one kind of consumable article for use in printing, and a memory arranged within the pack body, the memory being capable of storing data relating to information indicative of a change in characteristics of the consumable article dependent on a time period elapsed after filling or producing of the consumable article, and an acquisition circuit for acquiring the information from the memory of the media pack.

According to this printer, when using the media pack, it is possible to easily recognize the change in characteristics of the consumable article within the media pack.

Preferably, the printer includes an image processing circuit capable of executing image processing of image data by using coefficients, and a coefficient-changing circuit capable of changing the coefficients used in the image processing, based on the acquired information.

According to this preferred embodiment, it is possible to easily compensate for degradation of the consumable article.

To attain the eighth object, according to a tenth aspect of the invention, there is provided a camera with a printer comprising a camera body, a printer integrally combined with the camera body, a shake sensor capable of detecting a shake of the camera body, a correction circuit capable of correcting a blur of a captured image according to an output from the shake sensor, and a controller for controlling operation of the printer according to the output from the shake sensor.

According to this camera with a printer, it is possible to optimally control the print operation performed in a condition where a blur can occur, and a user can handle the apparatus with ease. Further, the shake sensor for the camera can also be utilized as a blur sensor for controlling printing by the printer, which contributes to reduction of the size of the whole apparatus.

Preferably, the printer includes a recording head reciprocally movable in a scanning direction, and the camera includes a head position sensor capable of detecting a position of the recording head, the controller stopping a scanning operation of the recording head at a predetermined scanning position according to the output from the shake sensor.

Preferably, the printer includes a recording head movable in a predetermined scanning direction, and the controller controls operation of the recording head in the predetermined scanning direction according to a shake amount in the predetermined scanning direction.

Preferably, the printer is capable of scanning in a scanning direction, and the controller controls a scanning speed of the recording head in the scanning direction according to the shake amount in the main scanning direction.

Preferably, the printer feeds a print medium sheet in a sub-scanning direction while moving the recording head in a main scanning direction, and the controller determines the shake amount in the sub-scanning direction based on the output from the shake sensor, and controls movements of the recording head and the print medium in the sub-scanning direction relative to each other according to the shake amount in the sub-scanning direction.

Preferably, the date information includes hour and minute data.

The above and other objects, features, and advantages of the invention will become more apparent from the following detailed description taken in conjunction with the accompanying drawings.

DETAILED DESCRIPTION OF PREFERRED EMBODIMENTS

The present invention will now be described in detail with reference to the drawings showing embodiments thereof.

A term "print" or "printing" (or "recording"), as used throughout the present specification is intended to mean not only an operation for forming intended information including characters and figures, but also a wide range of operations for forming images, patterns, or the like on a print medium, regardless of whether or not the images or patterns are intended and whether or not they are made apparent so as to allow humans to visually perceive them, and operations for processing a print medium.

Further, the "print medium" is intended to mean not only paper used by an ordinary printer, but also a wide range of materials allowing reception of ink, such as cloth, a plastic film, a metal plate, glass, ceramic, wood, or the like.

Moreover, the "ink" (also referred to as "liquid"), should be interpreted in its broad sense, similarly to the above term "print", and is intended to mean a liquid applied onto the print medium so as to form images, patterns, or the like, process the print medium, or be subjected to processing (such as coagulation or insolubilization of a coloring material contained in the ink applied onto the print medium) of the ink.

Figure 3:
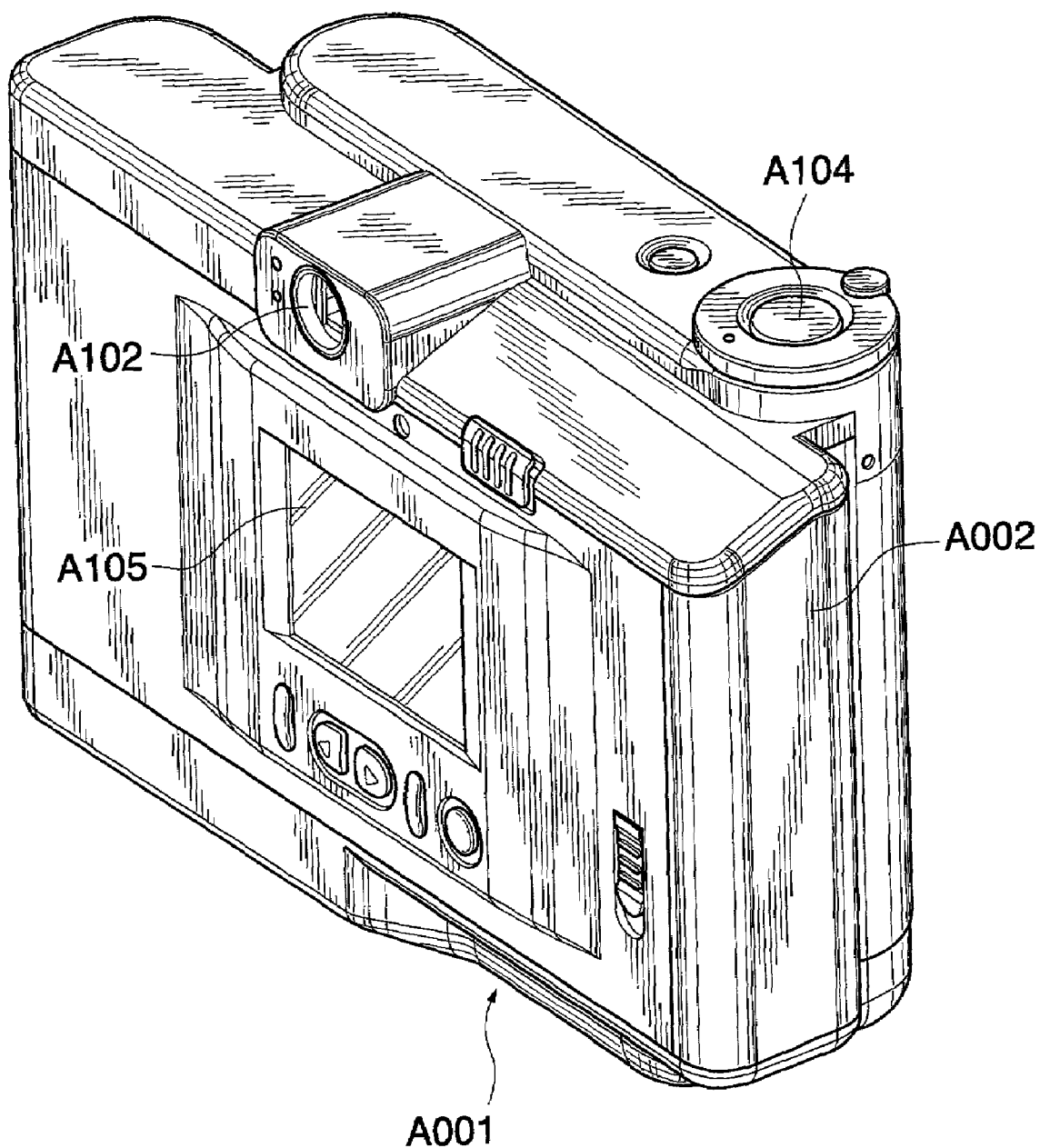
FIG. 3 is a perspective view of the FIG. 1 camera, as viewed diagonally from rear.
Figure 4:
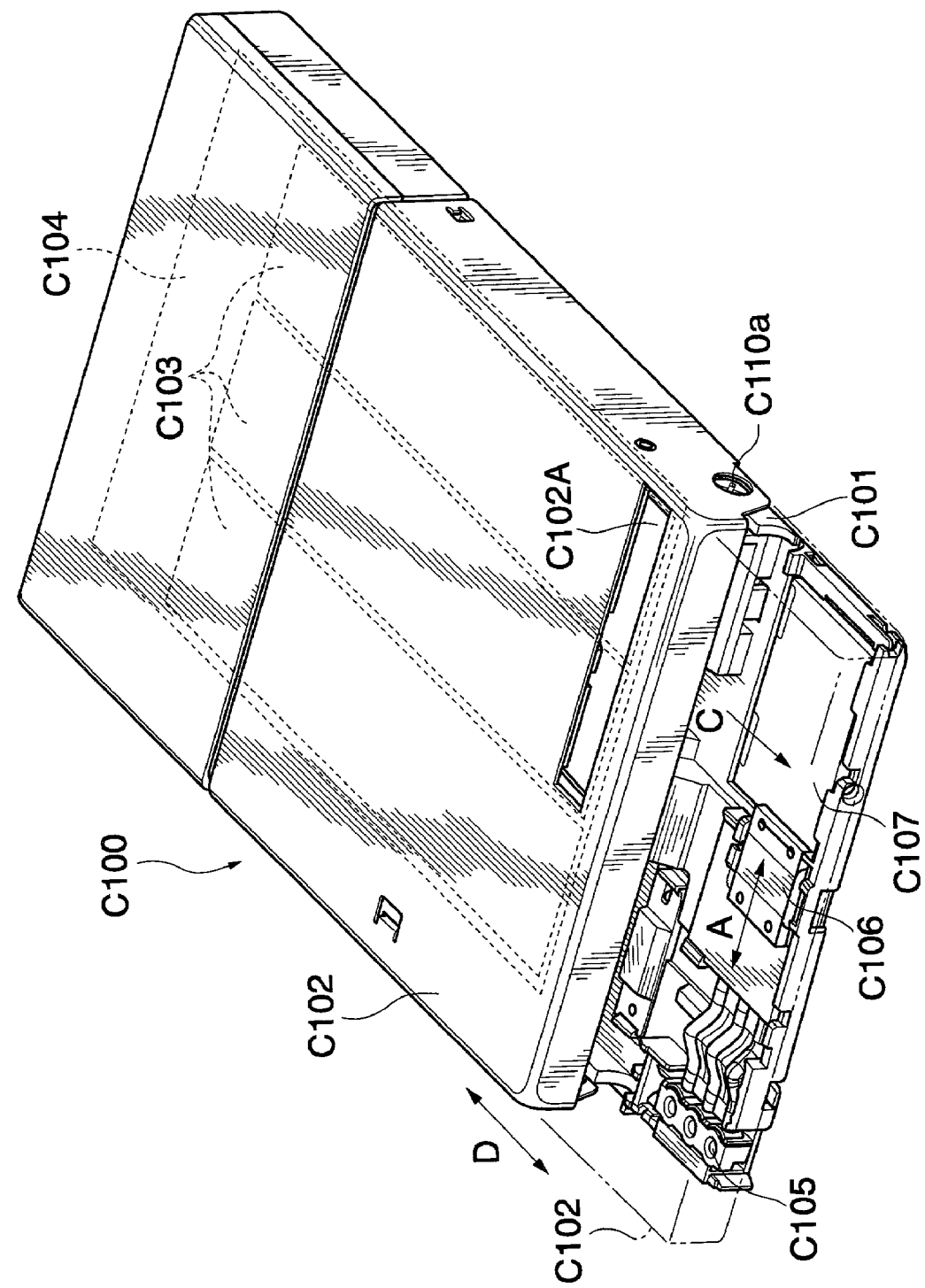
FIG. 4 is a perspective view of a media pack mountable in the FIG. 1 camera.
Figure 5:
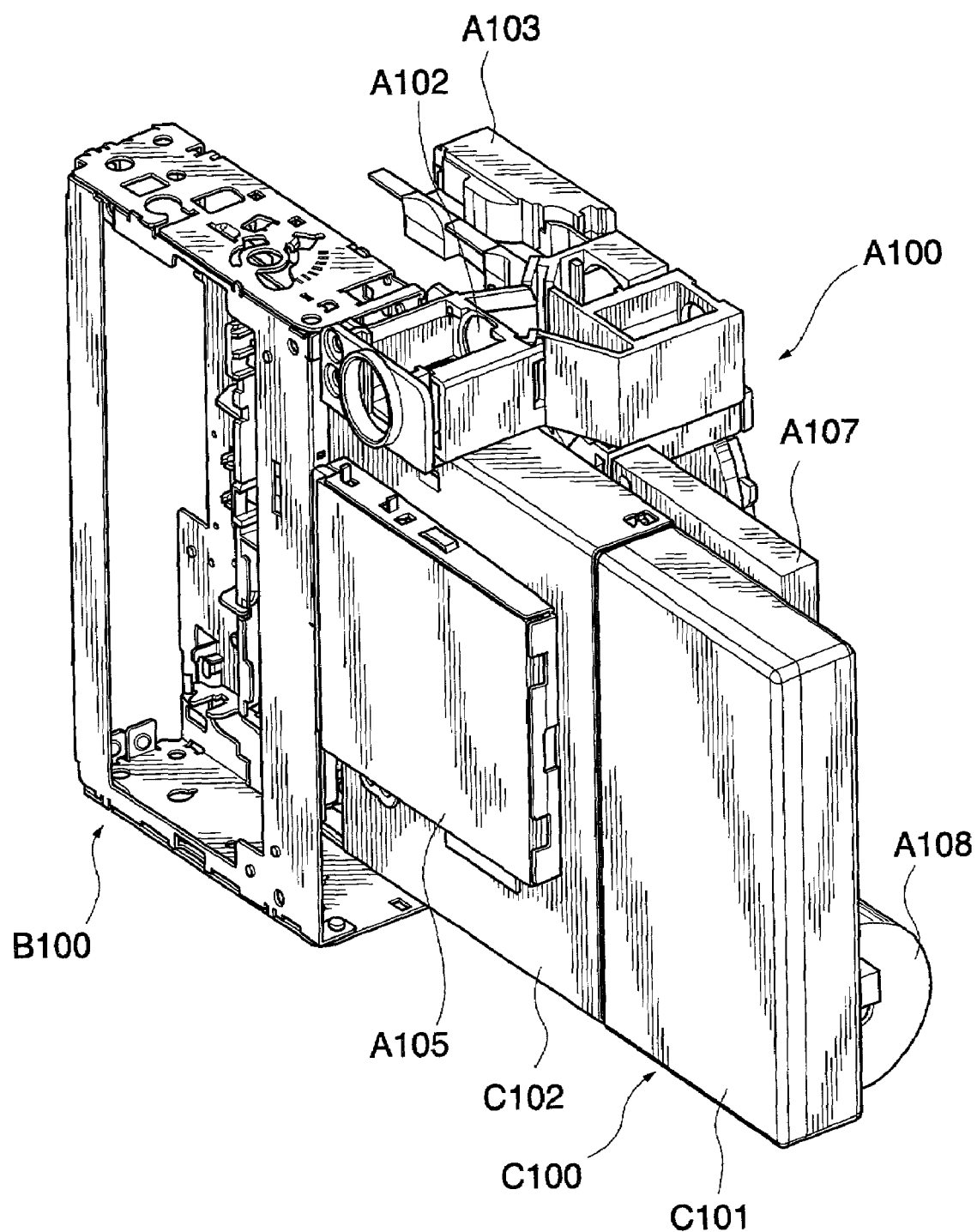
FIG. 5 is a perspective view showing the arrangement of essential parts within the FIG. 1 camera.

First, the basic mechanical construction of an apparatus according to the present embodiment will be described with reference to FIGS. 1 through 9. The apparatus is formed as a camera with a printer. A body A001 of the apparatus incorporates a printer section (recorder section) B100 arranged on a rear side of a camera section A100 in a manner integrated with the camera section A100. It should be noted that the printer section B100 may be removable from the camera section A100. In this case, the blocks A100 and B100 are provided with interactive communication contacts, which can be directly connected to each other when the block B100 is mounted in the apparatus body A001. The printer section B100 records images by using ink and a print medium supplied from a media pack C100. According to the construction of the present embodiment, as is apparent from FIG. 5 showing the apparatus body A001 with a housing thereof removed, as viewed from the rear, the media pack C100 is fitted in the right-hand side, as viewed in the figure, of the apparatus body A001, and the printer section B100 is arranged on the left-hand side, as viewed in the figure. To perform recording by the printer section B100, the apparatus body A001 can be set into a recording position in which the apparatus body A001 is placed with a liquid crystal display section A105, referred to hereinafter and a lens A101 positioned below. When the apparatus body A001 is in this recording position, a recording head B120, referred to hereinafter, of the printer section B100 is brought into a position for ejecting the ink downward. The recording position, however, is not limited to the position described above, but can be identical to a position in which the apparatus body A001 is placed for photographing operation by the camera section A100. However, it is preferred from the viewpoint of stability of recording operation that the apparatus body A001 is set into the above recording position allowing the ink to be ejected downward.

Next, the basic construction of the apparatus according to the present embodiment will be described more in detail with respect to the following separate three sections: A "CAMERA SECTION", B "MEDIA PACK", and C "PRINTER SECTION".

A. "Camera Section"

Figure 1:
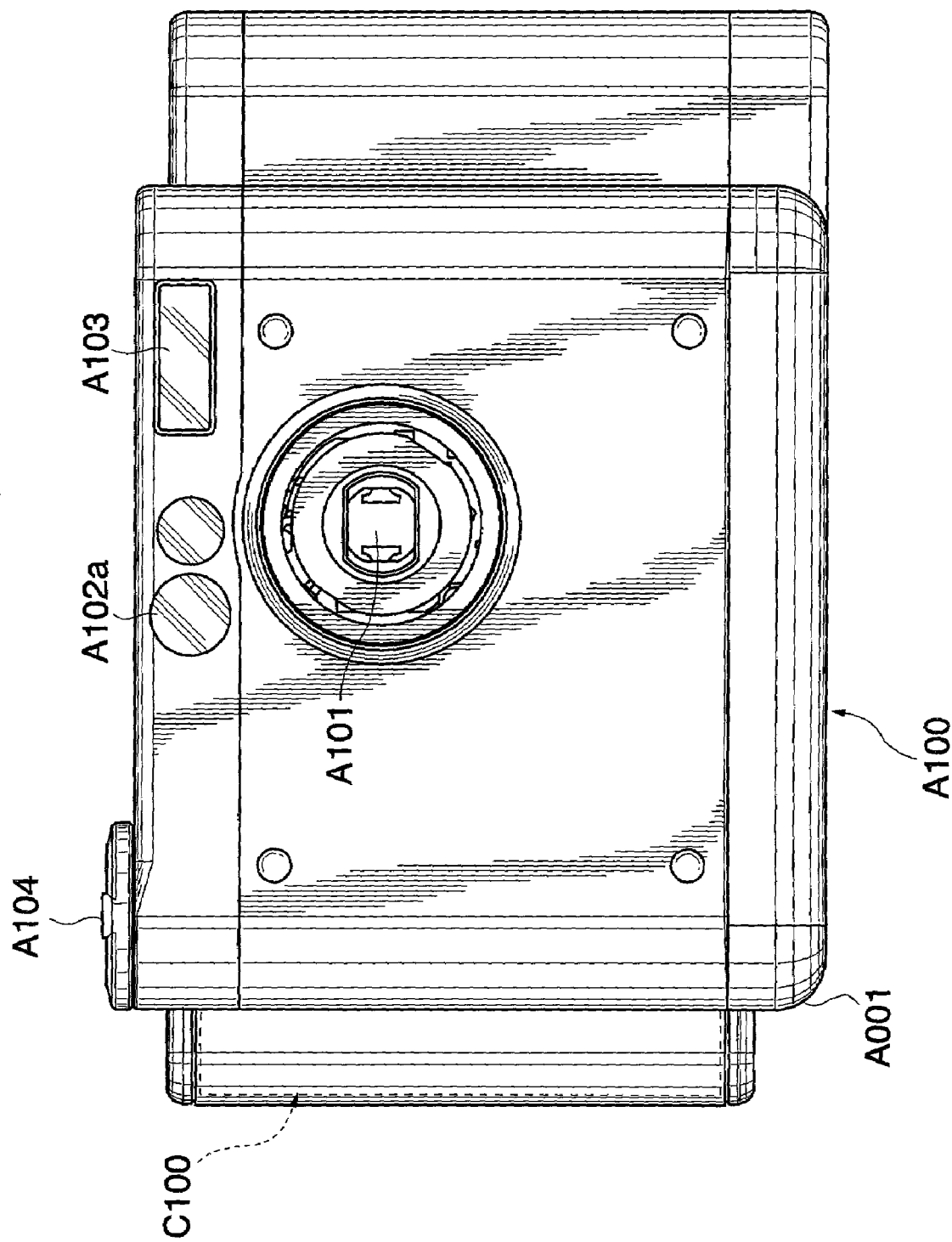
FIG. 1 is a front view of a camera with a printer to which the present invention is applicable.
Figure 2:
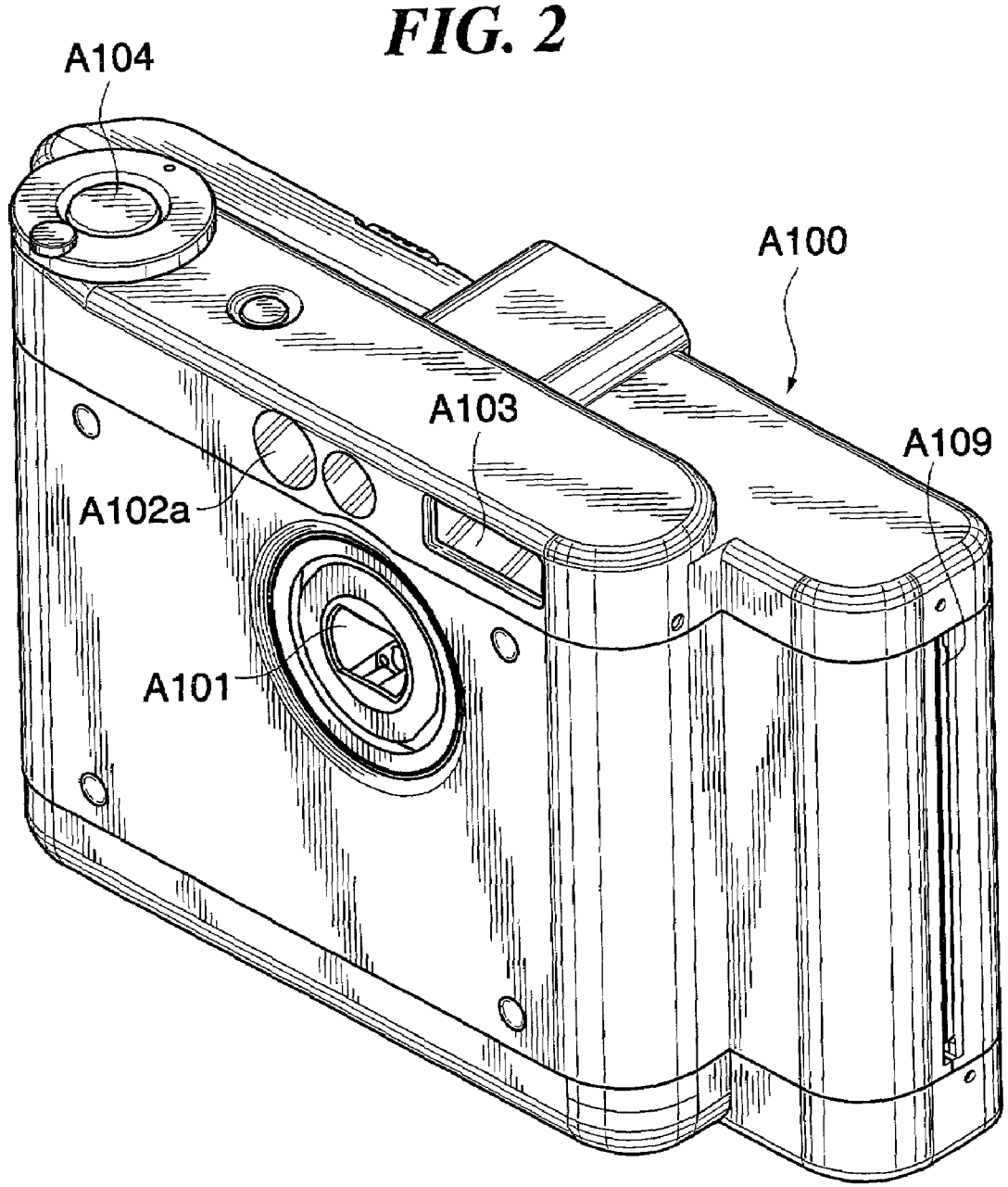
FIG. 2 is a perspective view of the FIG. 1 camera, as viewed diagonally from front.

The camera section A100 basically forms an ordinary digital camera. The camera section A100 is integrated into the apparatus body A001 together with the printer section B100, described in detail hereinafter, whereby a digital camera incorporating a printer, which has appearances shown in FIGS. 1 to 3, is formed. In these figures, reference numeral A101 designates the lens, A102 an optical viewfinder, A102a a finder window, A103 a photographing flashing light-emitting device, A104 a release button, and A105 the liquid crystal display section (external display section). As described in detail hereinafter, the camera section A100 processes data representative of an image picked up by an imaging element, such as a CCD or MOS, stores the image data in a compact flash memory card (e.g. a CF card) A107, processes a signal for displaying the image, and performs transmission and reception (interactive communication) of various kinds of data to/from the printer section B100. Reference numeral A109 designates a discharge port from which a print medium C104, referred to hereinafter, printed with an image obtained by photographing is discharged. The discharge port A109 has a lid, not shown, provided thereon. Reference numeral A108 appearing in FIG. 5 designates a battery serving as a power source for the camera section A100 and the printer section B100.

B. "Media Pack"

The media pack C100 is removable from the apparatus body A001. In the present embodiment, a lid A002 (see FIG. 3) covering an insertion section, not shown, of the apparatus body A001 is opened, and the media pack C100 is inserted through the insertion section whereby the media pack C100 is mounted in the apparatus body A001 as shown in FIG. 1. The insertion section is closed by the lid A002, as shown in FIG. 3, when the media pack C100 is not mounted in the apparatus body A001, and opened only when the media pack C100 is mounted. FIG. 5 shows the apparatus body A001 having the media pack C100 inserted therein, in a state of the housing thereof being removed. The media pack C100 has a pack body C101 which has a shutter C102 mounted thereon in a manner slidable in directions indicated by a double-headed arrow D shown in FIG. 4. When the media pack C100 is not mounted in the apparatus body A001, the shutter C102 is biased in a position indicated by two-dot chain lines in FIG. 4 by a spring, not shown, whereas when the media pack C100 is mounted in the apparatus body A001, the shutter C102 slides into a position indicated by solid lines in FIG. 4 against the urging force of the spring.

The pack body C101 contains ink packs C103 and a print medium 104. In FIG. 4, the ink packs C103 are received below the print medium C104. In the embodiment, the number of the ink packs C103 provided in the pack body C101 is three, and inks of Y (yellow), M (magenta) and C (cyan) are contained separately in the respective ink packs C103. Further, the print medium C104 is sheets of paper in the present embodiment, and will be hereinafter also referred to as "print medium sheets" where necessary. A stack of approximately twenty print medium sheets C104 are contained in the pack body C101. The inks and the print medium sheets C104 are selected as an optimal combination for desired image recording and received in the identical media pack C100. Therefore, various media packs C100 are provided which contain different combinations of inks and print medium sheets, e.g. media packs for ultrahigh image quality, for normal image quality, for seals (split seals), for glossy paper, for recycled paper, for acid-free paper, etc., to thereby allow users to selectively mount one of the media packs C100 in the apparatus body A001 according to the kind of an image to be recorded and the use of the print medium sheets having the image formed thereon. This makes it possible to positively record a desired image by using an optimal combination of inks and print medium sheets. Further, the media pack C100 is provided with a non-volatile memory as a memory, referred to hereinafter, such as an EEPROM (identification IC). The EEPROM stores the kinds and remaining amounts of inks and print medium sheets contained in the media pack, information on the date and time of refilling or production of the inks and the print medium sheets, and history data including detailed error data and date information concerning occurrence of abnormal conditions as well as data of aging change of color characteristics of the inks and the print medium sheets, as described in detail hereinafter.

When the media pack C100 is mounted in the apparatus body A001, the ink packs C103 are each connected to an ink supply system, referred to hereinafter, of the apparatus body A001 via a corresponding one of three joints C105 corresponding to the respective inks of the colors Y, M and C. On the other hand, the print medium sheets C104 are each taken out by a sheet feed roller C110 (see FIG. 9), referred to hereinafter, while being separated one sheet from another by a separating mechanism, not shown, followed by being each fed or advanced in a direction indicated by an arrow C. A driving force for driving the sheet feed roller C110 is supplied to the same from a feed motor M002 (see FIG. 9), referred to hereinafter, arranged in the apparatus body A001, via a connection section C110a.

Further, the pack body C101 is provided with a wiper C106 for wiping the recording head, referred to hereinbelow, of the printer section to clean the same and an ink absorber C107 for absorbing waste ink discharged from a waste liquid joint, not shown, of the printer section. The recording head of the printer section reciprocates in the main scanning direction indicated by a double-headed arrow A, as described hereinafter. When the media pack C100 is removed from the apparatus body A001, the spring, not shown, urges the shutter C102 to slide into the position indicated by the two-dot chain lines in FIG. 4, for protection of the joints C105, the wiper C106 and the ink absorber C107.

C. "Printer Section"

The printer section B100 of the apparatus of the present embodiment is a serial type using an ink jet recording head. The printer section B100 will be described with respect to the following three separate sections, C-1. "PRINT OPERATION SECTION", C-2. "PRINT MEDIA FEEDER SYSTEM" and C-3. "INK SUPPLY SYSTEM".

C-1. "Print Operation Section"

Figure 6:
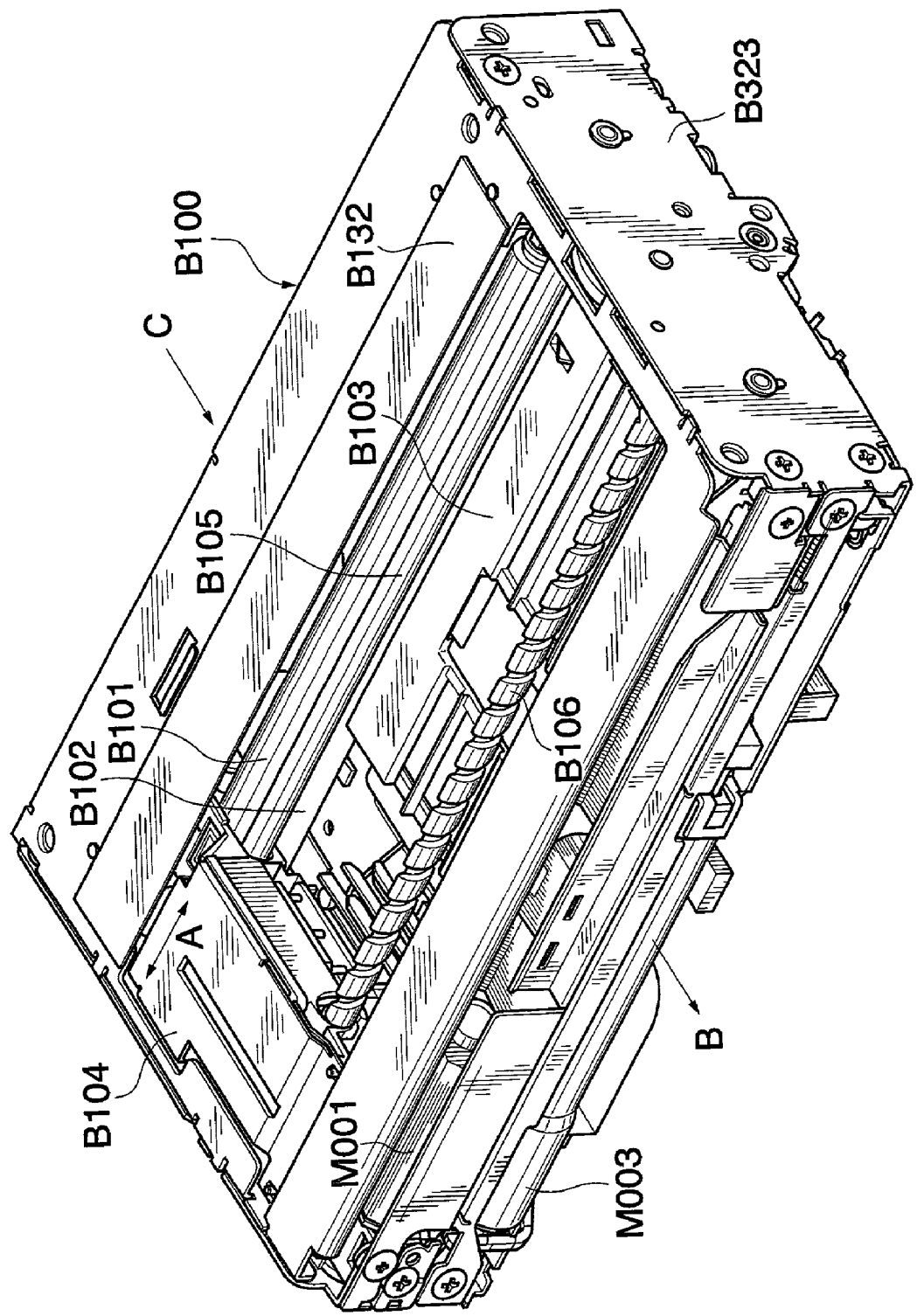
FIG. 6 is a perspective view of a printer section in the FIG. 5 arrangement.
Figure 7:
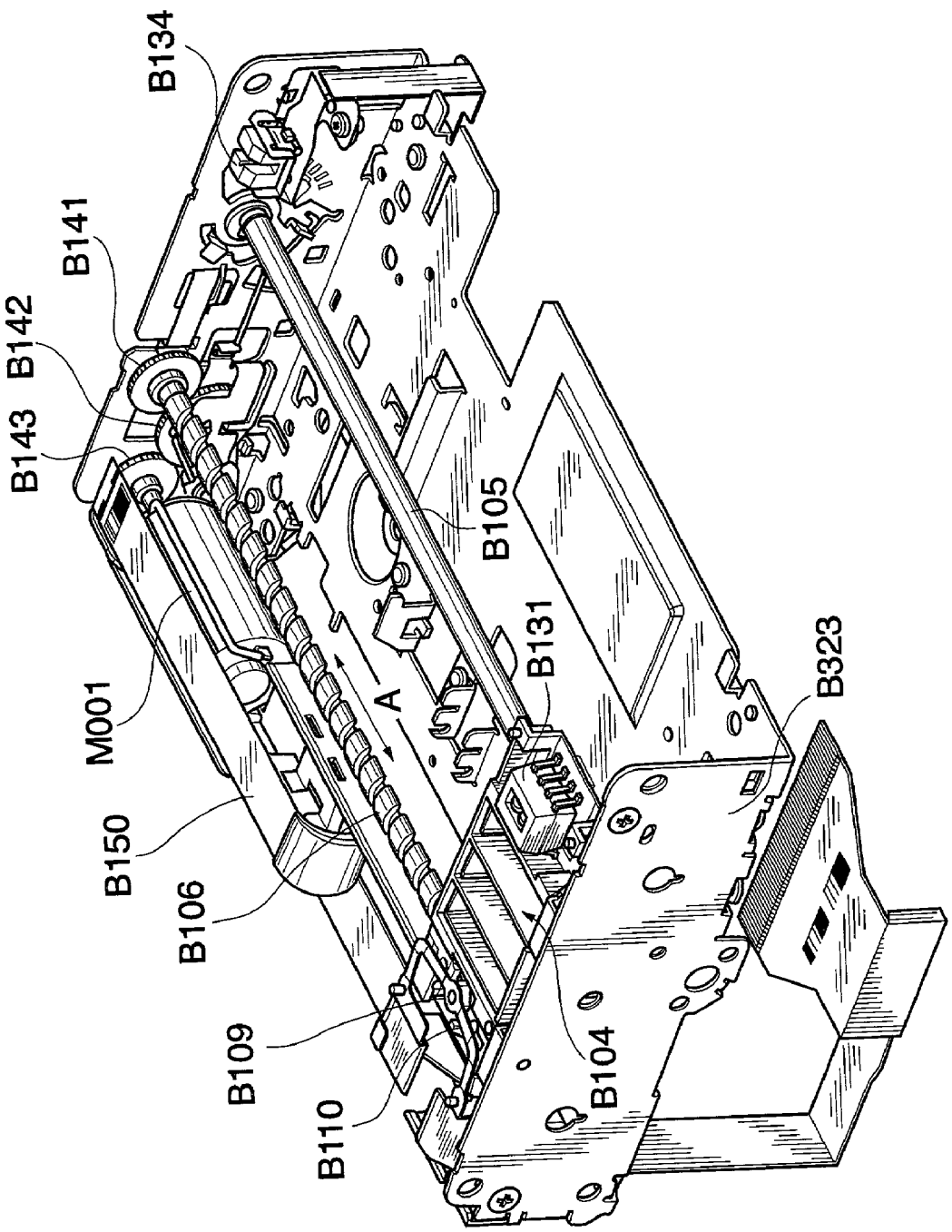
FIG. 7 is a perspective view of the FIG. 6 printer section with a portion thereof dismounted.

FIG. 6 is a perspective view showing the whole of the printer section B100, while FIG. 7 is a perspective view with some portions of the printer section B100 removed.

As shown in FIG. 5, a leading end portion of the media pack C100 mounted in the apparatus body A001 is positioned at a predetermined location within the body of the printer section B100. A print medium sheet C104 fed from the media pack C100 in the direction indicated by the arrow C in FIG. 6 is fed on a platen B103 in a sub-scanning direction (direction orthogonal to the main scanning direction A) indicated by an arrow B in a state sandwiched between an LF roller B101 and an LF pinch roller B102 of a print media feeder system described hereinbelow. Reference numeral B104 designates a carriage moved along a guide shaft B105 and a lead screw B106 in a reciprocating manner in the main scanning direction A.

Figure 8:
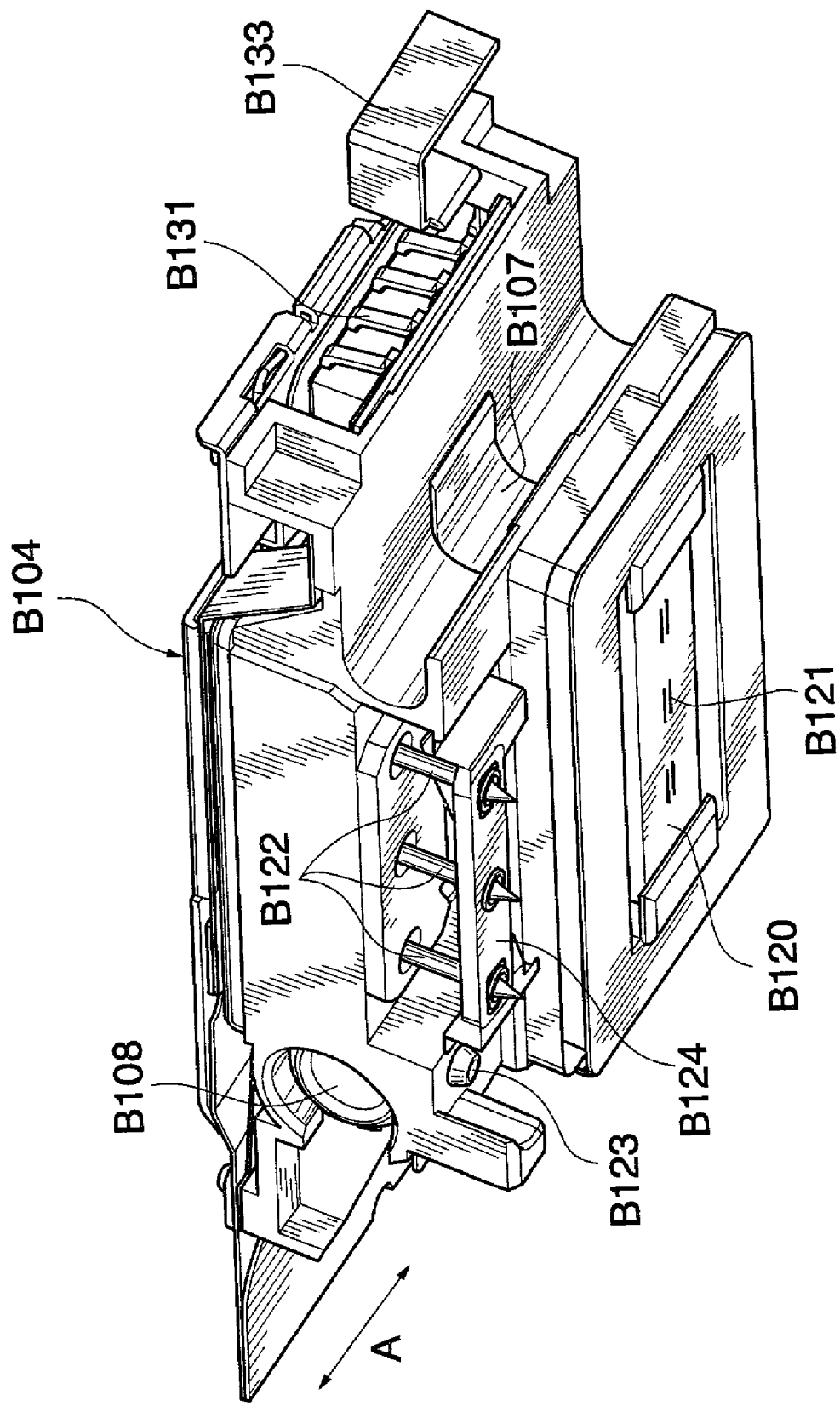
FIG. 8 is a perspective view of a carriage in the FIG. 6 printer section.

As shown in FIG. 8, the carriage B104 is provided with a bearing B107 for the guide shaft B105 and a bearing B108 for the lead screw B106. At a predetermined location in the carriage B104, there is mounted a screw pin B109 (see FIG. 7) via a spring B110 in a manner projecting inward of the bearing B108. The screw pin B109 has an end thereof fitted in a spiral groove formed in the outer peripheral surface of the lead screw B106, whereby rotational motion of the lead screw B106 is converted into reciprocating motion of the carriage B104 in the directions A.

Further, mounted on the FIG. 8 carriage B104 are the ink jet recording head B120 capable of emitting inks of colors Y, M and C and an auxiliary tank, not shown, containing the inks to be supplied to the recording head B120. The recording head B120 is formed with a plurality of ink jet orifices B121 (see FIG. 8) arranged in a direction intersecting the main scanning direction A (direction orthogonal to the main scanning direction A in the present embodiment). The ink jet orifices B121 each form a nozzle which is capable of emitting ink supplied from the auxiliary tank. Means for generating energy for causing emission of ink can be implemented by an electrothermal converter provided for each nozzle. The electrothermal converter is driven for being heated to thereby generate bubbles in ink within the corresponding nozzle, and bubbling energy of the bubbles causes ink droplets to jet from the corresponding ink jet orifice B121.

The capacity of the auxiliary tank is smaller than the total capacity of the ink packs C103 held in the media pack C100, and the auxiliary tank contains respective amounts of inks of the colors required for recording an amount of image corresponding to at least one print medium sheet C104. The auxiliary tank is formed therein with ink reservoirs for storing the respective inks of the colors Y, M, C, and each of the ink reservoirs is formed with an ink supply section and a negative pressure-introducing section. The ink supply sections are each connected to a corresponding one of three hollow needles B122, while the negative pressure-introducing sections are connected to a common supply air port B123. As described in detail hereinafter, the auxiliary tank constructed as above is supplied with ink from each of the ink packs C103 in the media pack C100 when the carriage B104 is brought to its home position shown in FIG. 6.

In FIG. 8 illustrating the carriage B104, reference numeral B124 designates a needle cover. When the needles B122 and the joints C105 (see FIG. 4) of the media pack are not connected to each other, the needle cover B124 is urged downward by the urging force of a spring, not shown, into a position for protecting the needles B122, whereas when the needles B122 and the joints C105 are connected to each other, the needle cover B124 is pushed upward against the urging force of the spring to release the needles B122 from the protected state. A position of the carriage B104 in the direction A is detected by cooperation of an encoder sensor B131 arranged in the carriage B104 and a linear scale B132 (see FIG. 6) arranged in the body of the printer section B100. Further, when the carriage B104 is brought into its home position, this fact is sensed by cooperation of an HP (home position) flag B133 attached to the carriage B104 and an HP sensor B134 (see FIG. 7) arranged in the body of the printer section B100.

In FIG. 7, the guide shaft B105 has opposite ends thereof each formed with a spindle, not shown, at a location off the central axis of the shaft B105. The guide shaft B105 is pivotally moved about the spindles to adjust the position of the carriage B104, whereby the distance between the recording head B120 and a print medium sheet C104 on the platen B103 (so-called "head-to-paper distance") is adjusted. The lead screw B106 is driven for rotation by a carriage motor M001 via a screw gear B141, an idler gear B142 and a motor gear B143. Reference numeral B150 designates a flexible cable for electrically connecting between a control system, referred to hereinafter, and the recording head B120.

The recording head B120 shown in FIG. 8 jets ink from the ink jet orifices B121 in response to image signals while moving in the main scanning direction A together with the carriage B104, to thereby record a one-line portion of an image on a print medium sheet on the platen B103. This one-line recording operation by the recording head B120 and a feed operation by the print media feeder system, described in detail hereinbelow, for feeding or advancing the print medium sheet by a predetermined amount in the sub-scanning direction B are repeatedly carried out, whereby the image is recorded on the print medium sheet line by line.

C-2. "Print Media Feeder System"

Figure 9:
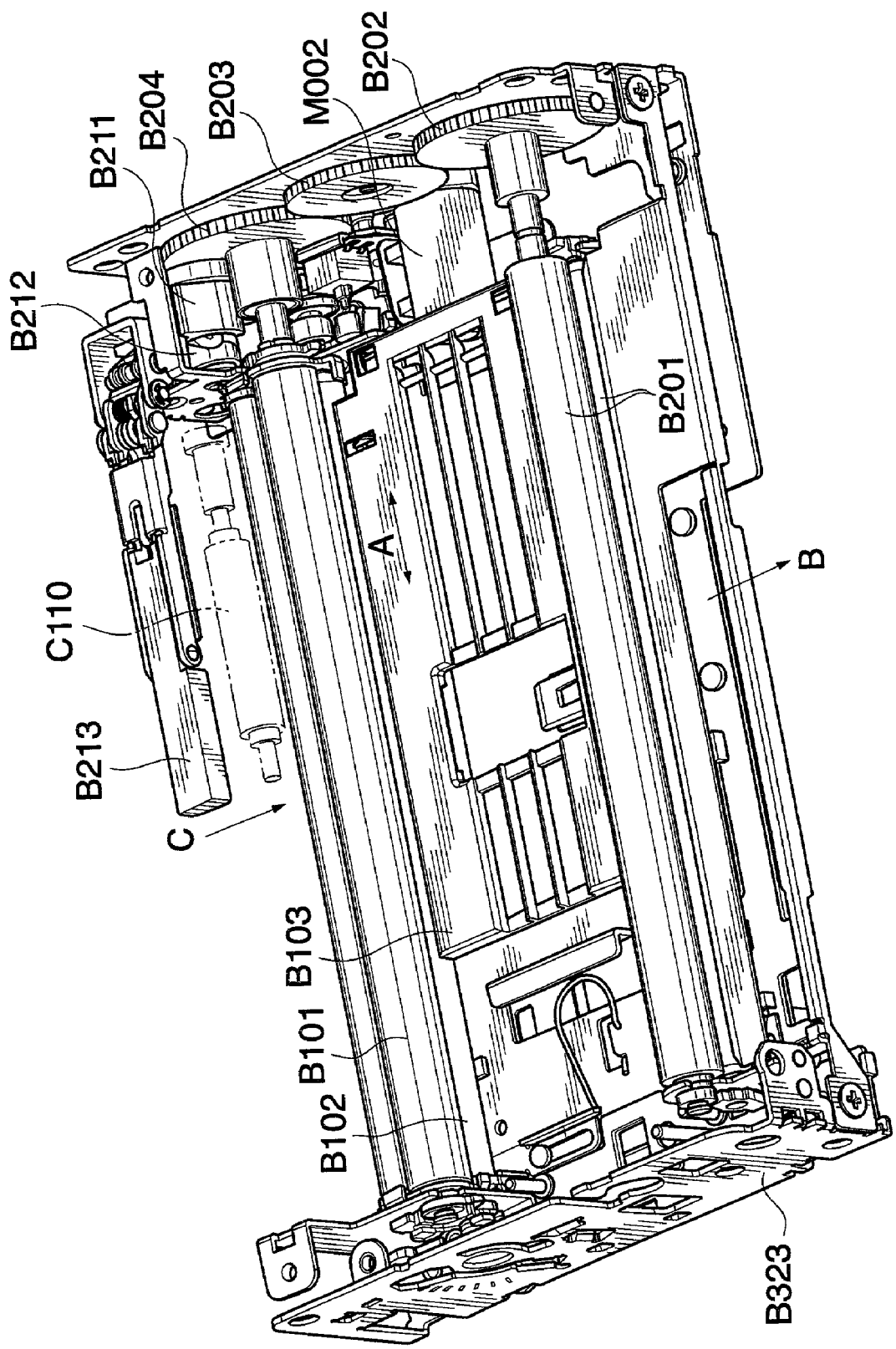
FIG. 9 is a perspective view showing the construction of a print media feeder system of the FIG. 6 printer section.

FIG. 9 is a perspective view showing the construction of the print media feeder system in the printer section B100. In FIG. 9, reference numeral B201 designates a pair of sheet discharge rollers. The upper one of the sheet discharge rollers B201 in the figure is driven by the feed motor M002 via a sheet discharge roller gear B202 and a relay gear B203. Similarly, the LF roller B101, referred to hereinbefore, is driven by the feed motor M002 via an LF roller gear B204 and the relay gear B203. As the feed motor M002 performs normal rotation, a driving force generated by the normal rotation of the feed motor M002 causes the sheet discharge roller B201 and the LF roller B101 to feed a print medium sheet C104 in the sub-scanning direction B.

On the other hand, when the feed motor M002 performs reverse rotation, a platen head B213 and a lock mechanism, not shown, are driven via a switching slider B211 and a switching cam B212, and at the same time a driving force generated by the reverse rotation of the feed motor M002 is transmitted to the sheet feed roller C110 of the media pack C100. More specifically, when the feed motor M002 performs reverse rotation, the driving force of the feed motor M002 causes the platen head B213 to move through a window C102A (see FIG. 4) of the shutter C102 of the media pack C100 to press a stack of the print medium sheets C104 in the media pack C100 downward as viewed in FIG. 4. As a result, the lowermost one of the print medium sheets C104 appearing in FIG. 4 is pressed onto the sheet feed roller C110 within the media pack C100. Further, the lock mechanism, not shown, is brought into an operative state by the driving force generated by the reverse rotation of the feed motor M002, to lock the media pack C100 in the apparatus body A001, thereby inhibiting removal of the media pack C100. At the same time, the driving force generated by the reverse rotation of the feed motor M002 is transmitted to the sheet feed roller C110 of the media pack C100 to cause the same to feed the lowermost print medium sheet C104 in the direction C.

As described above, with reverse rotation of the feed motor M002, only one print medium sheet C104 is fed out from the media pack C100 in the direction C in FIG. 9, and then when the feed motor M002 performs normal rotation, the sheet is fed out in the direction B.

C-3. "Ink Supply System"

The joints C105 of the media pack C100 mounted in the printer section B100 are positioned below the needles B122 (see FIG. 8) of the carriage B104 shifted to its home position. In the body of the printer section B100, there are formed joint forks, not shown, at a location below the joints C105. The joint forks move the joints C105 upward, whereby the joints C105 are connected to the needles B122. Thus, ink supply passages are formed between the ink packs C103 of the media pack C100 and the ink supply sections of the auxiliary tank in the carriage B104. Further, the body of the printer section B100 has a supply joint, not shown, formed at a location below the supply air port B123 (see FIG. 8) of the carriage B104 shifted to its home position. The supply joint is connected via a supply tube, not shown, to a pump cylinder of a pump, not shown, which functions as a negative pressure source. The supply joint is moved upward by a joint lifter, not shown, to be connected to the supply air port B123 of the carriage B104, whereby a negative pressure-introducing passage is formed between the negative pressure-introducing section of the auxiliary tank within the carriage B104 and the pump cylinder. The joint lifter is driven by the driving force of a joint motor M003 to move up and down the supply joint and the joint forks together.

The negative pressure-introducing section of the auxiliary tank is provided with a thin-film air-liquid separating member, not shown, allowing passage of air and blocking passage of ink. The air-liquid separating member permits passage of air drawn by suction from the auxiliary tank through the negative pressure-introducing passage, whereby the auxiliary tank is replenished with ink from the media pack C100. Then, when the auxiliary tank is fully filled with ink to such an extent that the ink reaches the air-liquid separating member, the air-liquid separating member blocks passage of the ink, whereby supply of ink is automatically stopped. The air-liquid separating member is provided in the ink supply section of each ink reservoir within the auxiliary tank so as to stop supply of ink automatically on a reservoir-by-reservoir basis.

Further, the body of the printer section B100 is provided with a suction cap, not shown, which is capable of capping the recording head B120 (see FIG. 8) on the carriage B104 shifted to its home position. The suction cap is capable of sucking ink from the ink jet orifices B121 of the recording head B120 (head recovery process) by utilizing a negative pressure introduced thereinto from the pump cylinder through a suction tube, not shown. Further, the recording head B120 emits ink non-contributive to image recording into the suction cap as required (preliminary emission process). The ink emitted into the suction cap is discharged from the pump cylinder into the ink absorber C107 within the media pack C110 through a waste liquid tube, not shown, and a waste liquid joint, not shown.

The pump cylinder is cooperatively associated with a pump motor, not shown, for driving the same for reciprocating motion, and other component parts, to form a pump unit. The pump motor also functions as a drive source for vertically moving a wiper lifter, not shown. The wiper lifter moves upward the wiper C106 of the media pack C100 mounted in the printer section B100, to shift the same to a position for wiping the recording head B120.

Next, the basic construction of a signal processing system of the apparatus including the control system will be described with respect to the following section D "SIGNAL PROCESSING SYSTEM" with reference to FIGS. 10 to 20.

D. "Signal Processing System"

Figure 10:
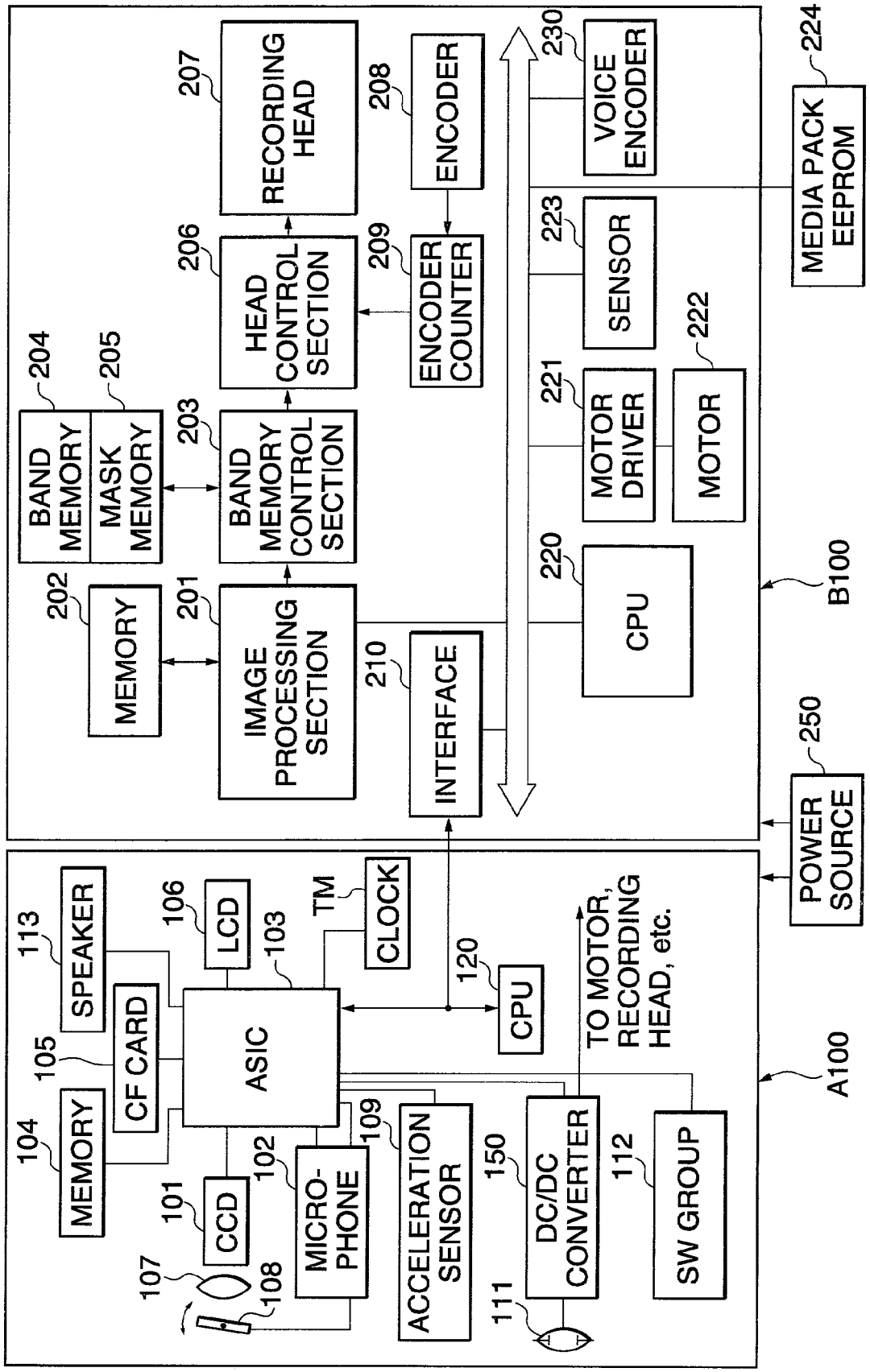
FIG. 10 is a block diagram schematically showing the arrangement of a camera section A100 and that of the printer section B100.

FIG. 10 is a schematic block diagram showing the arrangement of the camera section A100 and that of the printer section B100.

In the camera section A100, reference numeral 101 designates a CCD as an imaging element. Needless to say, another type of imaging element (such as a MOS image sensor) may be employed in place of the CCD. Reference numeral 102 designates a microphone for use in voice input, 103 an ASIC (Application-Specific Integrated Circuit) for executing hardware processing, 104 a first memory for temporary storage of image data, etc., 105 a CF card (corresponding to the "CF card A107") as a removable image memory for storing a photographed image, 106 an LCD (corresponding to the "liquid crystal display section A105") for displaying a picked-up or reproduced image, 107 a lens unit (corresponding to the "lens A101"), and 108 a shake compensation mechanism for optically compensating for a camera shake which occurs at the time of photographing. In the present embodiment, the shake compensation mechanism is comprised of transparent flat plates arranged in a manner parallel to each other and inclined by a predetermined angle with respect to the optical axis, and the inclination angle is changed in a direction in which a camera shake is suppressed, according to the amount and direction of the shake. It should be noted that the shake compensation mechanism may be alternatively implemented by a variable apical angle prism or so-called electronic antivibration (technique of reducing blur due to a camera shake by temporarily storing a picked-up image signal in an image memory and then shifting a reading area in the memory from which the signal is read, according to the amount of the camera shake). Reference numeral 109 designates an acceleration sensor or the like as a shake-detecting sensor for detecting the amount of a camera shake, 111 a photographing flashing light-emitting device (corresponding to the "photographing flashing light-emitting device A103"), reference numeral 112 an SW group of various switches (including the "release button A104"), 113 a speaker for generating operation sounds, warning sounds, and so forth, 120 a first CPU controlling the camera section A100, and 150 a DC-to-DC converter as a booster circuit for causing the photographing flashing light-emitting device 111 to emit the flashing light. It should be noted that in the present embodiment, part of boosted output voltage of the booster circuit for the photographing flashing light-emitting device 111 is used as a predetermined DC voltage to be supplied to a pumping motor or the recording head in the printer section, for ink pumping operation or for print operation, respectively, which contributes to reduction of the size of the whole apparatus.

Further, the camera section A100 includes a clock TM for counting date information to be recorded in association with each photographed image. The ASIC 103 performs synchronizing control related to various kinds of times and hours both in the camera section and the printer section, based on the counts of the clock TM.

In the printer section B100, reference numeral 210 designates an interface between the camera section A100 and the printer section B100, 201 an image processing section (including a binarization processing section for binarizing an image), 202 a second memory for use in image processing, 203 a band memory control section, 204 a band memory, 205 a mask memory, and 206 a head control section, reference numeral 207 a recording head (corresponding to the "recording head B120"). Reference numerals 208, 209 designate an encoder corresponding to the encoder sensor B131 and an encoder counter, respectively. Further, reference numeral 220 designates a second CPU controlling overall operation of the printer section B100, 221 a motor driver, 222 a motor (including the "motors M001, M002, M003"), 223 a sensor group (including the "HP sensor B134"), 224 an EEPROM incorporated in the media pack C100, which may be any type insofar as it is a rewritable non-volatile memory, 230 a voice encoder section, and 250 a power source (corresponding to the "battery A108") for supplying electric power to the whole apparatus.

Figure 11:
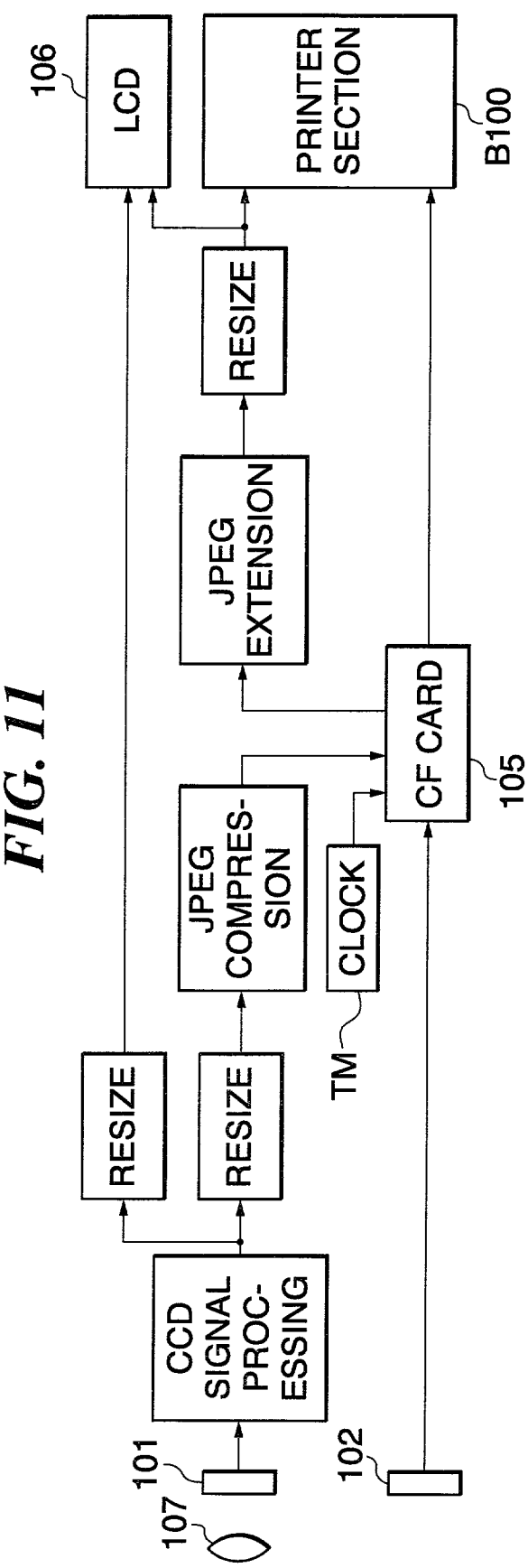
FIG. 11 is a functional block diagram useful in explaining image signal processing by the camera section A100.

FIG. 11 is a functional block diagram useful in explaining image signal processing performed by the camera section A100. In a photographing mode, an image picked up by the CCD 101 through the lens 107 is subjected to signal processing (CCD signal processing) by the ASIC 103 to be converted to a YUV (luminance-two color difference) signal. Then, the signal is resized to one with a predetermined resolution and JPEG-compressed, followed by being recorded on a CF card 105. Whenever an image is recorded onto a CF card 105, date information (e.g. time, day, month, year) automatically determined by the clock TM is also recorded in association with the recorded image. Voices are inputted through the microphone 102 and recorded onto the CF card 105 via the ASIC 103. Voices can be recorded simultaneously with photographing or alternatively after photographing by postrecording. In a reproduction mode, a JPEG image is read from the CF card 105 and JPEG-extended by the ASIC 103, and then further resized to an image with a resolution suitable for display, followed by being displayed on the LCD 106.

Figure 12:
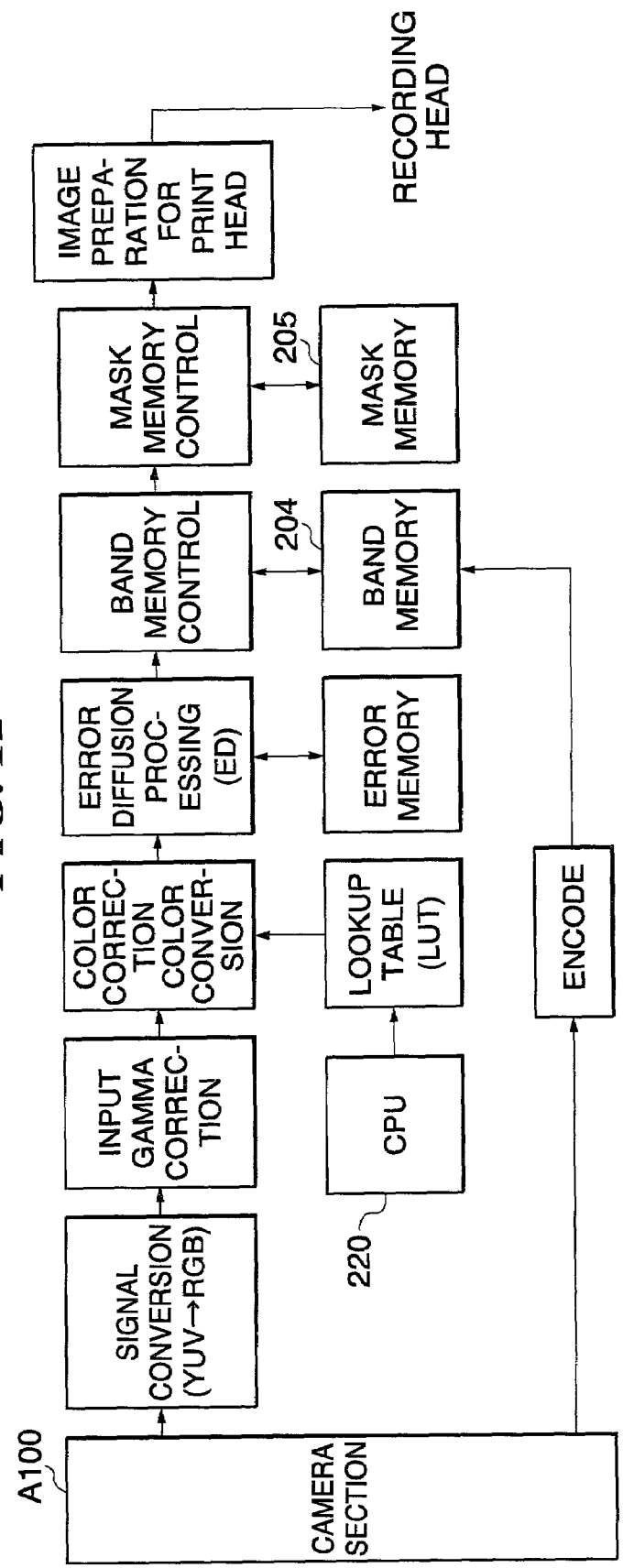
FIG. 12 is a functional block diagram useful in explaining image signal processing by the printer section B100.

FIG. 12 is a functional block diagram useful in explaining image signal processing performed by the printer section B100.

An image reproduced by the camera section A100, i.e. an image read from a CF card 105 is JPEG-extended by the ASIC 103, as shown in FIG. 11, and resized to one with a resolution suitable for printing. Then, the resized image data (YUV) is sent to the printer section B100 via the interface 210 appearing in FIG. 10. As shown in FIGS. 10 and 12, in the printer section B100, the image processing section 201 executes image processing of the image data sent from the camera section A100, conversion of the image data to an RGB signal, input γ correction according to the characteristics of the camera, color correction and color conversion by using a lookup table (LUT), and conversion of the RGB signal to a binary signal for printing. The color correction using the lookup table (LUT) may be performed by the CPU based on color correction data stored in the EEPROM 224 within the media pack, as described hereinafter.

In the binarization process, the second memory 202 is used as an error memory for execution of an error diffusion (ED) process. Although in the present embodiment, the binarization processing section of the image processing section 201 carries out the error diffusion process, it is also possible to execute other processing such as binarization processing using dither patterns. The binarized print data is temporarily stored in the band memory 204 via the band memory control section 203. Whenever the carriage B104 having the recording head 207 and the encoder 208 mounted thereon moves a predetermined distance, an encoder pulse is delivered to the encoder counter 209 of the printer section B100 from the encoder 208. In synchronism with inputting of the encoder pulse, the print data is read from the band memory 204 and the mask memory 205, and the head control section 206 controls the recording head 207, based on the print data, for recording.

Next, band memory control in FIG. 12 will be described.

The plurality of nozzles of the recording head 207 are arranged in an array such that the density of e.g. 1200 dpi is maintained. In order to enable the recording head 207 to perform recording operation during a single main scanning operation by the carriage in the direction A shown in FIGS. 6 to 9, it is required to prepare recording data in an amount corresponding to the number of the nozzles with respect to the sub-scanning direction (direction B in FIGS. 6 to 9) and in an amount corresponding to a recording area (i.e. corresponding to one scanning operation) with respect to the main scanning direction. Recording data is generated by the image processing section 201 and then temporarily stored in the band memory 204 by the band memory control section 203. When recording data in the amount corresponding to one scanning operation is stored in the band memory 204, the carriage is driven in the main scanning direction for scanning. During this main scanning operation of the carriage, encoder pulses inputted from the encoder 208 are counted by the encoder counter 209. The recording data is read from the band memory 204 according to the encoder pulses, and the recording head 207 jets ink droplets based on the read image data. When a two-way recording method is employed in which image recording is carried out both in the forward scanning operation and return scanning operation of the recording head 207 in the direction A (i.e. forward path recording and return path recording are performed), image data is read from the band memory 204 in dependence on the direction of scanning by the recording head 207. For instance, during a forward path recording operation of the recording head 207, the address of image data read from the band memory 204 is sequentially incremented, whereas during a return path recording operation of the recording head 207, the address of image data read from the band memory 204 is sequentially decremented.

Actually, when image data (formed of the colors C, M, Y) generated by the image processing section 201 has been written to the band memory 204 to provide one band of image data, scanning by the recording head 207 is permitted. Then, the recording head 207 scans, whereby the image data is read from the band memory, and the recording head 207 records an image based on the image data. During the recording operation, image data to be recorded next is prepared by the image processing section 201 and written onto an area of the band memory 204 corresponding to the recording position of the image.

As described above, the band memory control is executed while being switched between the operation of writing recording data (colors C, M, Y) generated by the image processing section 201 into the band memory 204 and the operation of reading the recording data from the same in synchronism with the scanning operation by the carriage so as to send the same to the head control section 206.

Next, a description will be given of mask memory control in FIG. 12.

The mask memory control is required when a multi-path recording method is adopted. In this method, a single line of recording image having a width corresponding to the length of a nozzle row is recorded in a plurality of scanning operations by the recording head 207. More specifically, the amount of a single feed of a print medium sheet, which is fed intermittently in the sub-scanning direction, is set to 1/N of the length of a nozzle row. As a result, e.g. when N=2 holds, a single line of a recording image is recorded by two scanning operations each time a corresponding divisional portion thereof is recorded (two-path recording), and when N=4 holds, a single line of a recording image is recorded by four scanning operations each time a corresponding divisional portion thereof is recorded (four-path recording). Similarly, when N=8 holds, eight-path recording is performed, and when N=16 holds, 16-path recording is performed. Thus, in the multi-path recording method, one line of a recording image is recorded by a plurality of scanning operations each time a corresponding divisional portion thereof is recorded by the recording head 207.

Actually, the mask memory 205 stores mask data for use in allocating image data to a plurality of scanning operations by the recording head 207, and based on AND data of the mask data and the image data, the recording head 207 ejects ink to record the image.

Further, as shown in FIG. 11, voice data stored in a CF card 105 is sent by the ASIC 103 to the printer section B100 via the interface 210, similarly to image data. The voice data sent to the printer section B100 is encoded by the voice encoder 230, and then subjected to a predetermined modulation, followed by being embedded in a print image as "watermark" information in the form of two-dimensional barcode. When it is not necessary to input voice data into a print image or when an image having no voice data is printed, voice data in the form of two-dimensional barcode is not printed, but only the image is printed.

In the present embodiment, there are carried out media pack consumable article management control for coping with degradation of consumable articles (i.e. ink and print medium sheets) within a media pack C100, antivibration control in the photographing mode and carriage control in a print mode both performed by using the shake-detecting sensor (acceleration sensor) 109, and power supply control for using the boost-type DC-to-DC converter 150 provided for the photographing flashing light-emitting device of the camera section A100, as a power supply for printing operation by the recording head 207 of the printer section B100 or ink pumping operation carried out for the recording head 207.

Figure 20:
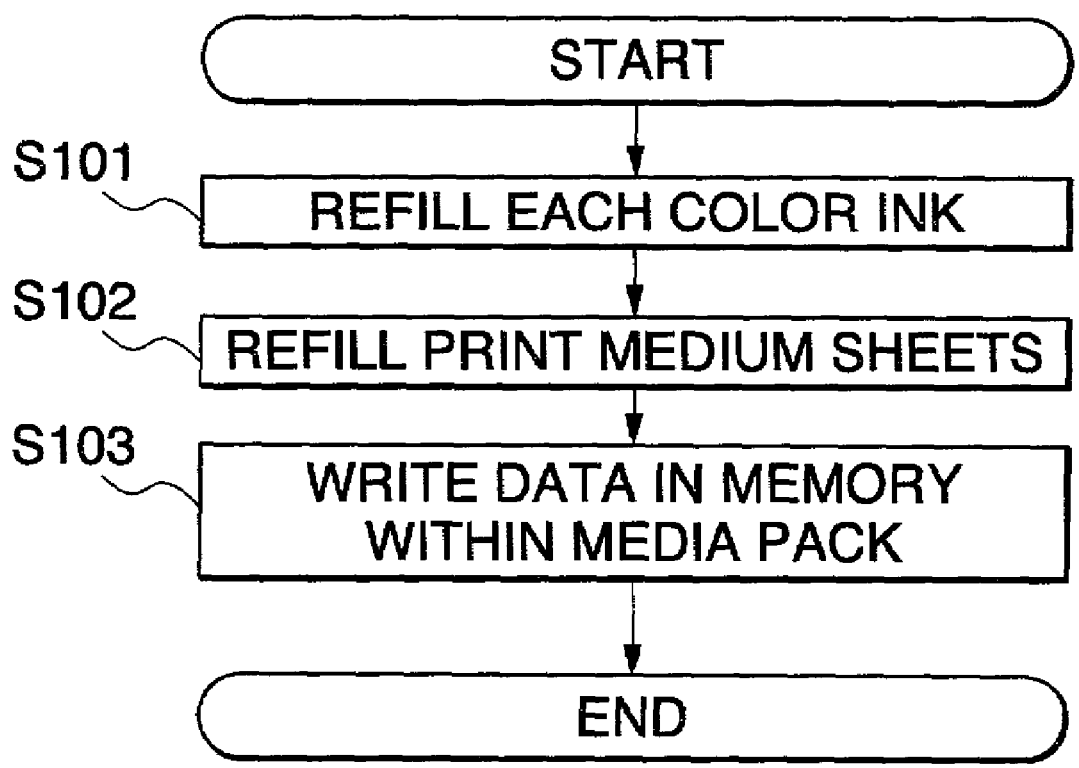
FIG. 20 is a flowchart showing a procedure of replenishment (refilling) of the media pack C100 with consumable articles.

First, the media pack consumable article management control will be described. FIG. 20 is a flowchart which shows a procedure of replenishing (refilling) the media pack C100 with consumable articles.

The media pack C100 according to the present embodiment can be replenished with ink and print medium sheets as consumable articles. Further, the media pack C100 incorporates the EEPROM 224 to which data concerning the consumable articles and the replenishment of the media pack C100 therewith can be written. The date data of a remaining quantity of the consumable articles and a date of replenishment or production of the media pack C100 are written in the EEPROM 224 and updated whenever the quantity of the consumable articles is reduced or the media pack C100 is replenished (refilled) or produced. The updated data are used for management of the consumable articles within the media pack C100.

When it is required to replenish the media pack C100 with consumable articles, the media pack C100 is brought to a factory or a print shop, where consumable articles are filled into the media pack C100 manually by workers of the factory or the print shop. In the refilling operation, as shown in FIG. 20, first at a step S101, ink packs C103 of the respective colors (Y, M, C) within the media pack C100 are each refilled with a corresponding ink, and at a step S102, print medium sheets C104 are refilled. Then, data of the date (month and year and/or day and time) of the replenishment (refilling) or reproduction of the consumable articles, data of the characteristics of the refilled inks (including color characteristic data and data of viscosity), data of the remaining quantity of ink, data of characteristics of the print medium sheets (including data concerning the quality of the print medium sheets which can be classified e.g. into glossy paper, acid-free paper, recycled paper, or the like, and data of the ground color of the print medium sheets), data of the remaining number of the print medium sheets, and degradation characteristic data of the inks (including lookup table data representing the relationship between elapsed days, months or years and the change of each color as a linear matrix coefficient) are written in the EEPRON 224 within the media pack C100 by a memory writing device at a step S103. In this case, the lookup table data itself may not be stored in the EEPROM 224, but a method may be employed in which a plurality of kinds of lookup tables for color correction are stored in advance in the lookup table appearing in FIG. 12, and data for enabling selection of one of the tables according to the degree of degradation of the consumable articles is stored in the EEPROM 224, a memory within the camera section, or a memory within the printer section.

When the replenishment (refilling) of the media pack C100 with the consumable articles is completed by execution of the above steps, the media pack C100 is sent or directly handed to the user. It should be noted that identical data to the data mentioned above are stored in each media pack C100 shipped as an article from factories.

Thus, when a media pack C100 is in actual use, the data concerning the consumable articles are read from the EEPROM 224, and management of the consumable articles is performed based on the read data. Consequently, it is possible to estimate the degree of degradation of the consumable articles, based on the above data, and carry out processing for warning, color correction, and the like, based on the result of the estimation.

Figure 13:
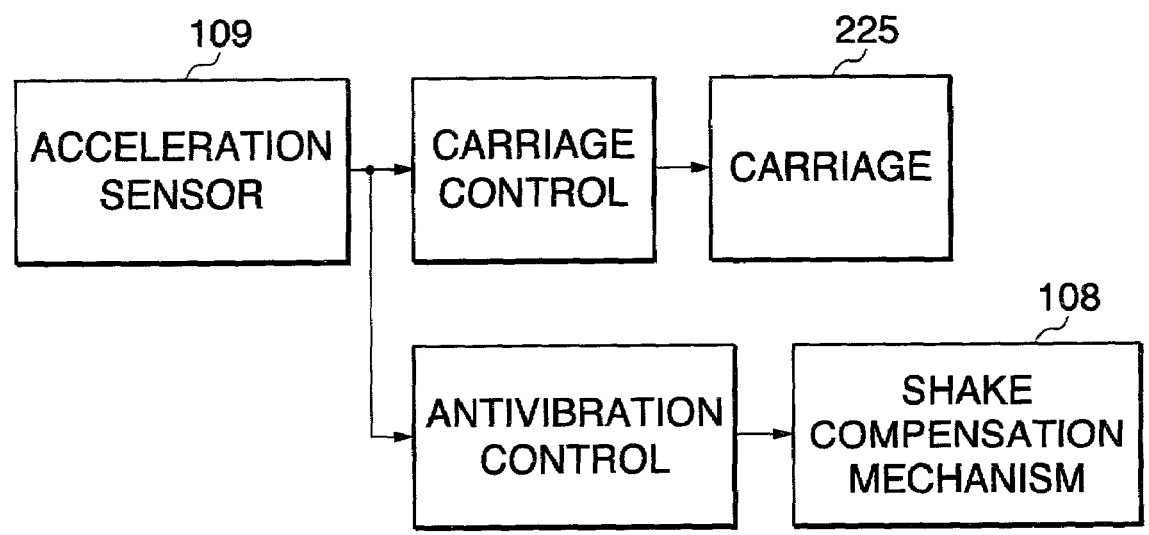
FIG. 13 is a functional block diagram useful in explaining antivibration control in a photographing mode and carriage control in a print mode, carried out by the camera section.

Next, a description will be given of the antivibration control in the photographing mode and the carriage control in the print mode. FIG. 13 is a functional block diagram useful in explaining antivibration control performed by the camera section in the photographing mode and the carriage control in the print mode performed by the same.

According to the present embodiment, in the photographing mode, the antivibration control for suppressing blur of an image due to a camera shake is executed based on an output signal from the acceleration sensor 109. In the antivibration control, the amount and direction of the camera shake are detected based on the output signal from the acceleration sensor 109, and then the amount of correction by the shake compensation mechanism 108 is controlled based on the detected amount and direction of the camera shake. More specifically, a control variable for changing an incident light path with respect to the lens 107 in such a direction as will suppress the blur of the image due to the camera shake is calculated as a correction amount, and the shake compensation mechanism 108 is operated based on the correction amount. As a result, the blur of the image due to the camera shake is corrected to obtain a clear image data.

Further, in the print mode, the amount of the camera shake is detected based on the output signal from the identical acceleration sensor 109, and carriage control for temporarily suspending print operation is carried out in dependence on the detected amount of the camera shake. More specifically, in the carriage control, when the detected amount of the camera shake is larger than a predetermined amount, a command for stopping the carriage 225 at a predetermined position (main scanning start position or main scanning end position) is delivered to the printer section B100. In the printer section B100, when the command is received, a motor driving the carriage 225 is controlled to temporarily stop the carriage 225 at the predetermined position.

Figure 14:
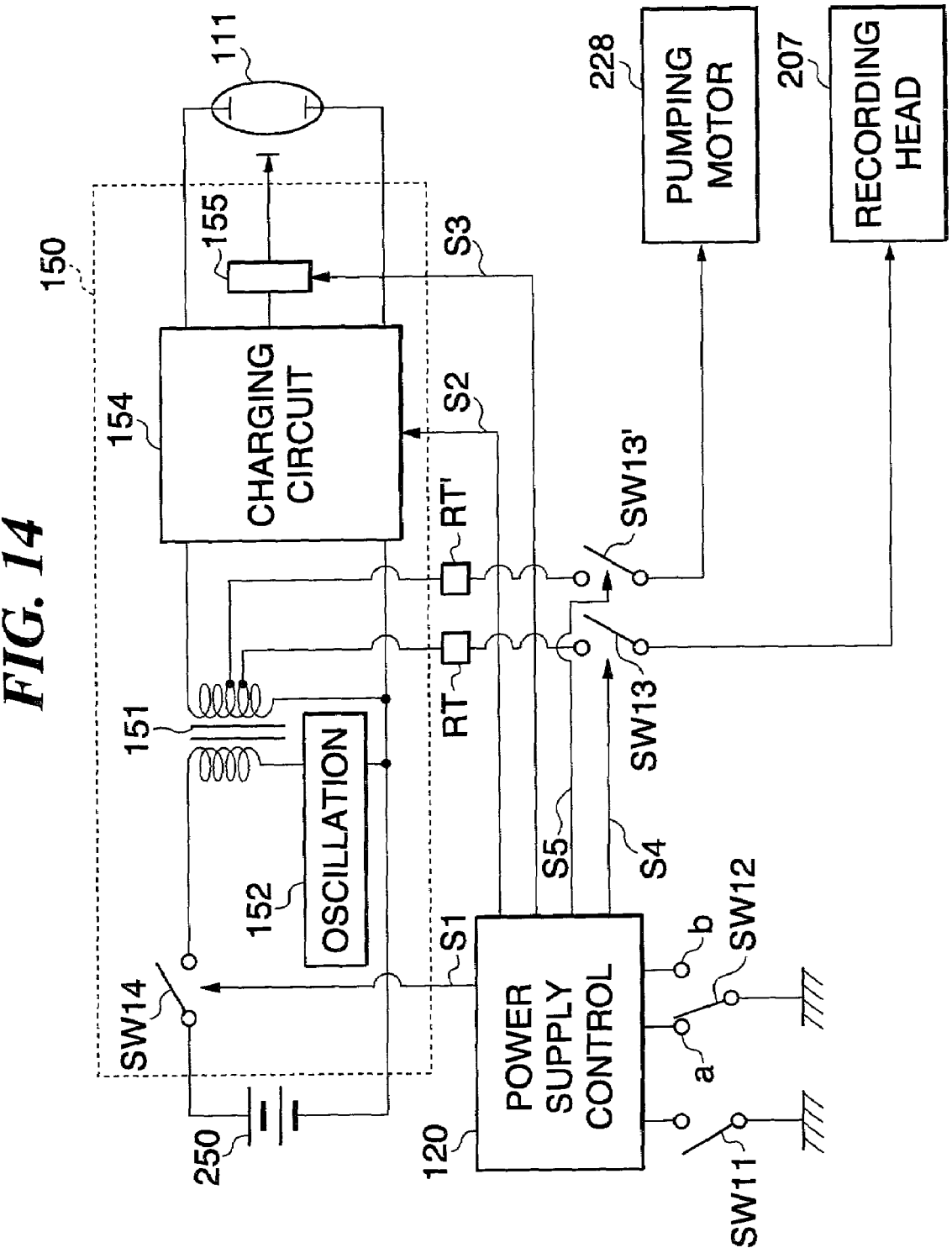
FIG. 14 is a functional block diagram useful in explaining power supply control in which a DC-to-DC converter 150 for firing of a photographing flash by a photographing flashing light-emitting device is utilized as a power source for boosting a voltage applied to a recording head 207 for printing or ink pumping.
Figure 15:
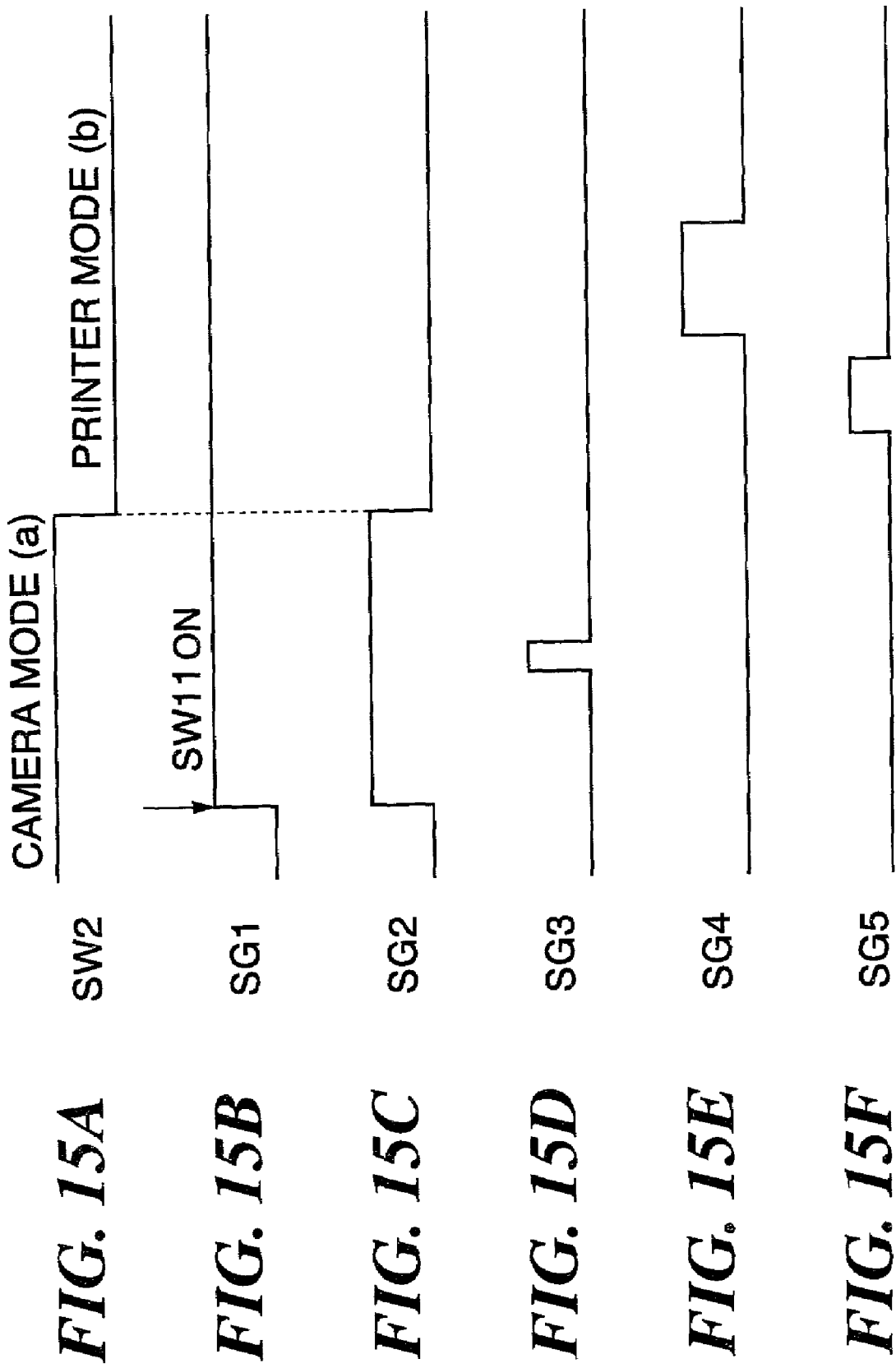
FIGS. 15A to 15F collectively form a timing chart showing timings in outputs of respective drive signals S1 to S4 in the FIG. 14 power supply control.

Next, a description will be given of the power supply control for using the boost-type DC-to-DC converter 150 provided for the photographing flashing light-emitting device, as the power supply for printing operation by the recording head 207 of the printer section B100 or ink pumping operation carried out for the recording head 207. FIG. 14 is a functional block diagram useful in explaining the power supply control, while FIG. 15 is a timing chart showing timing of generation of drive signals SG1 to SG5 by the power supply control.

As shown in FIG. 14, the DC-to-DC converter 150 is comprised of a transformer 151 having a primary side to which is applied a voltage from the power source 250 via a switch (SW) 14, an oscillation circuit 152, a charging circuit 154 for generating a predetermined voltage to be supplied from a secondary side of the transformer 151 to the photographing flashing light-emitting device 111 and charging the same, and a trigger 155 for applying a predetermined trigger voltage to the photographing flashing light-emitting device 111. The secondary side of the transformer 151 outputs the voltage to be applied to the charging circuit 154, a drive voltage to be applied to the recording head 207 of the printer section B100 through a rectifying circuit RT, and a drive voltage to be applied to the motor 228 for pumping ink for the recording head through a rectifying circuit RT' via respective output terminals. The drive voltage for driving the recording head 207 is supplied to the recording head 207 via a switch (SW) 13, and the drive voltage for driving the pumping motor 228 is supplied to the motor 228 via a switch (SW) 13'.

The operations of the SW 13, SW 13' and SW14, the charging circuit 154 and the trigger 155 are controlled according to the power supply control by the CPU 120 of the camera section A100. More specifically, when a power switch (SW) 11 of the camera with a printer is turned on, the drive signal SG1 is delivered to the SW 14, whereby the SW 14 is turned on (see FIG. 15B). Then, based on an output from a mode switching switch (SW) 12, it is determined whether the present mode is a camera mode or a printer mode. If the SW 12 is in a state switched to a side "a", it is determined that the camera mode is set, while if the SW 12 is in a state switched to a side "b", it is determined that the printer mode is set. In the present embodiment, as shown in FIG. 15A, when the SW is turned on, the camera mode is set by default.

When the camera mode is set, the drive signal SG2 instructing the charging circuit 154 to start preliminary operation for lighting the photographing flashing light-emitting device 111 is delivered to the charging circuit 154 (see FIG. 15C). Then, the drive signal SG3 for causing the photographing flashing light-emitting device 111 to emit a flashing light is delivered to the trigger 155 in predetermined photographing timing (see FIG. 15D), whereby the photographing flashing light-emitting device 111 emits the flashing light.

When the user wants to print out a photographed image, he/she operates the SW 12 to set the printer mode (see FIG. 15A). When the printer mode is set, a drive signal 54 is delivered to the SW 13 in accordance with the timing of print operation by the recording head 207 (see FIG. 15E). As a result, the SW 13 is turned on, the drive voltage is supplied to the recording head 207 from the DC-to-DC converter 150 through the rectifying circuit RT. Further, when a drive signal S5 is delivered to the SW 13' for the ink pumping operation (see FIG. 15F), the SW 13' is turned on, whereby a drive voltage is supplied to the pumping motor 228 from the DC-to-DC converter 150 through the rectifying circuit RT'.

As described above, when the printer mode is set, since the DC-to-DC converter 150 supplies the drive voltage for printing to the recording head 207 or the drive voltage for pumping ink from the recording head 207 to the motor 228, the printer section B100 is not required to be additionally provided with a drive voltage supply circuit for printing by the recording head 207 or for pumping ink for the same, which makes it possible to simplify the construction of the printer section B100 and to largely reduce the size of the apparatus.

Next, the operation of the present apparatus will be described. FIGS. 16 to 19 are flowcharts which show an operating procedure of the camera with a printer.

Figure 16:
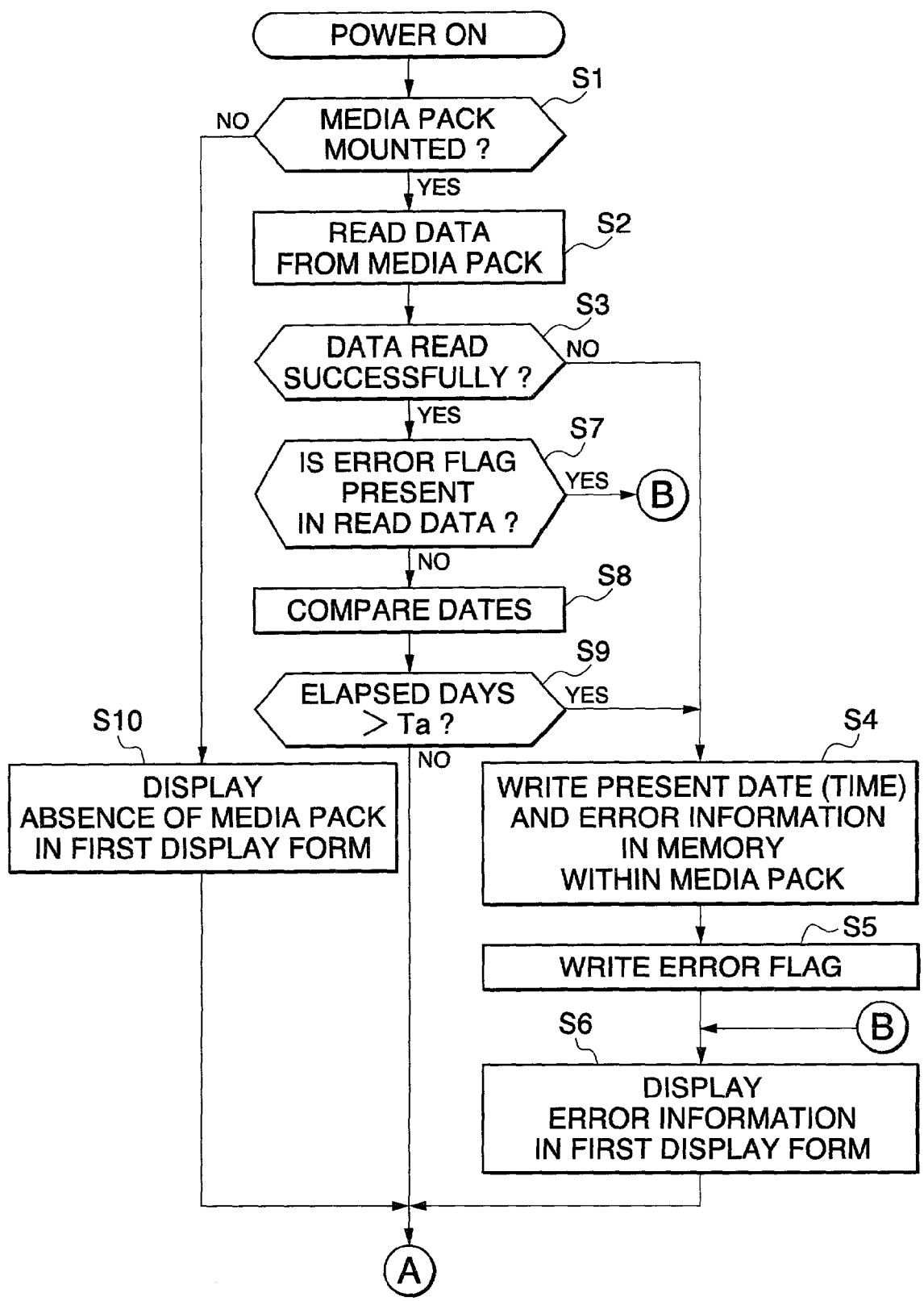
FIG. 16 is a flowchart showing an operating procedure of the camera with a printer.

As shown in FIG. 16, when the camera power source is turned on, first, it is detected at a step S1 whether or not a media pack is loaded, based on an output from a media pack loading detection switch, not shown. If the presence of the media pack is detected, the program proceeds to a step S2, wherein various data stored in the memory (EEPROM M224) within the media pack are read. Then, the program proceeds to a step S3, wherein it is determined whether or not the reading of the data was successfully performed.

If the reading of the data was failed, i.e. if communication with the memory within the media pack failed (e.g. when the data within the memory could not be properly read due to a faulty mechanical connection between electric contacts of the media pack and electric contacts of the camera body, or when in spite of proper electrical connection, it is determined that communication failed, due to noise introduced into the data from the memory), the program proceeds to a step S4, wherein the present date (including e.g. day, month, year (and time, if required)) is stored in the memory within the media pack, and at the same time error information is stored in the same in association with the date data. In this case where the communication failed, occurrence of the communication error is stored as error information.

Then, the program proceeds to a step S5, wherein an error flag is written to the memory within the media pack. At the following step S6, the error information is displayed on the LCD 106 in a first display form. In the first display form, predetermined marks, characters, or the like are used to express e.g. error information. Then, the program proceeds to a step S11 in FIG. 17.

If there was no communication error at the step S3, the program proceeds to a step S7, wherein it is determined whether or not there is any error flag contained in the data read from the memory within the media pack. In the present embodiment, if there occurs at least one of a case where there is no ink, a case where there is no paper as a print medium, a case where a predetermined time period has elapsed since loading of ink and/or paper, and others, an error flag is written to the memory within the media pack together with the error information.

Figure 17:
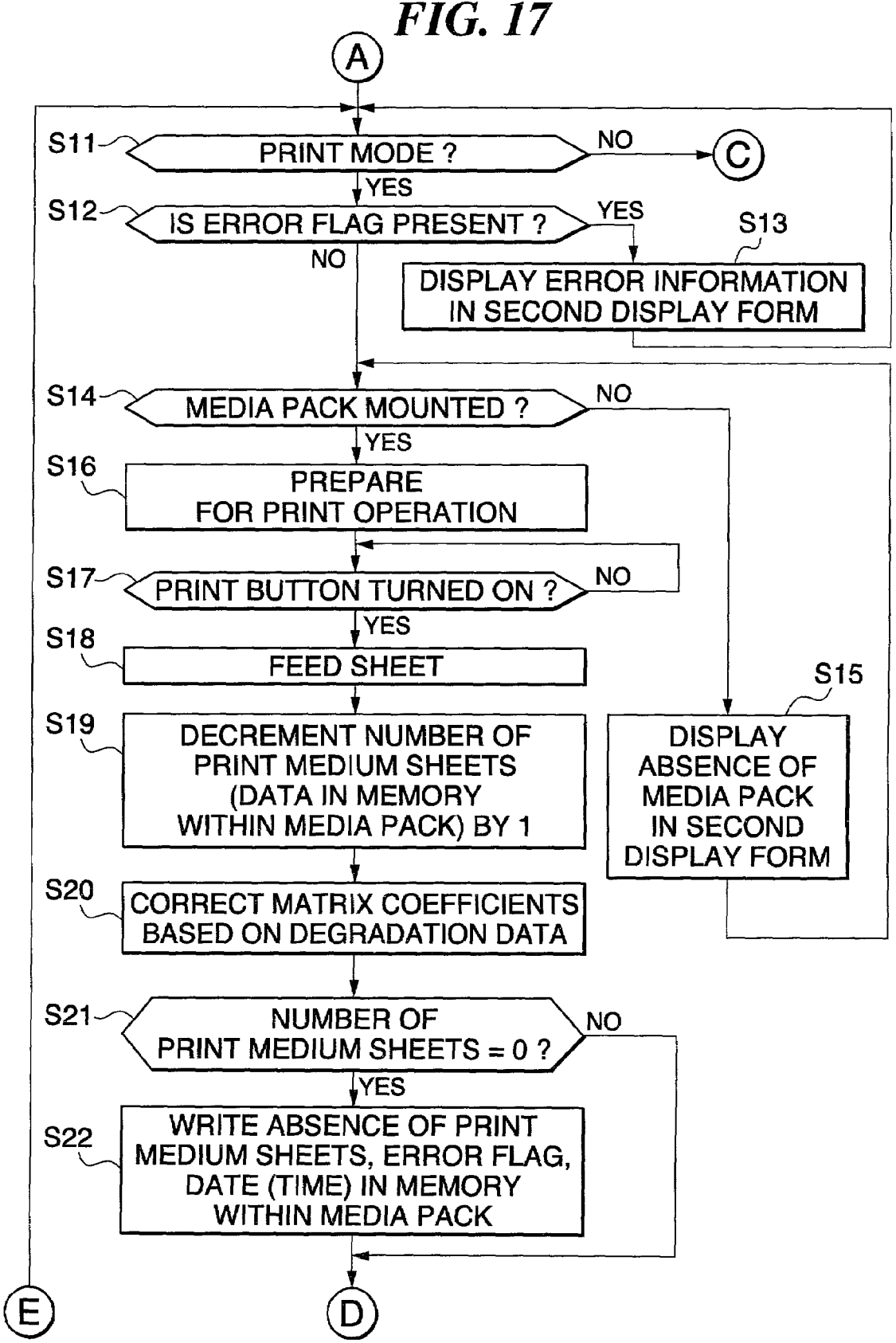
FIG. 17 is a continued part of the flowchart.

If an error flag was detected at the step S7, error information corresponding to the error flag is displayed on the LCD 106 in the first display form at a step S6, followed by the program proceeding to the step S1 in FIG. 17.

If no error flag was detected at the step S7, it is judged that the data read from the memory within the media pack is normal, and the program proceeds to a step S8. At the step S8, the date (e.g. day, month, year) of refilling the media pack with ink and/or a print medium, such as paper sheets, or the date of production of the ink or print medium is detected, and the date of refilling or production is compared with a date (e.g. day, month, year) determined by the clock TM in the camera body. Then, at the following step S9, it is determined whether or not a result of the comparison (difference between the two dates) is larger than a predetermined value Ta (e.g. two years). If the difference between the two dates is larger than the predetermined value, i.e. if more than two years have passed after refilling the media pack with ink and/or print medium production of the ink or print medium, it is judged that ink as a consumable article and/or a print medium such as paper sheets as consumable articles were deteriorated, and the program proceeds to the step S4, wherein error information that the degradation of the ink and/or print medium has occurred is stored in the memory within the media pack, and at the same time the date determined by the clock TM of the camera section is also stored in the same in association with the error information. Then, at the step S5, an error flag is written to the memory within the media pack, and at the following step S6, the error information is displayed in the first display form on the LCD 106 as display means, followed by the program proceeding to the step S11 in FIG. 17.

If it is determined that the difference is equal to or smaller than the predetermined value Ta at the step S9, the program proceeds to the step S11 in FIG. 17. Further, if it is detected at the step S1 that no media pack is loaded, the fact is displayed on the LCD 106 in the first display form. The notice displayed in the first display form at this step is one at the same warning level as the one displayed in the first display form at the step S6.

At the step S11, it is determined whether or not the present mode is the printer mode. If the present mode is the printer mode, the program proceeds to a step S12, wherein it is determined whether or not there is an error flag in the memory within the media pack. If an error flag exists, the program proceeds to a step S13, wherein the corresponding error information is displayed on the LCD 106 in a second display form, and at the same time, a warning sound is generated. The second display form is distinguished from the first one in that its warning level is set to be higher than the latter such that the user can notice the warning more easily. For example, when error information is expressed by using the same kind of mark or characters as in the first display form, the mark or characters are displayed in a larger size such that the error information can be recognized more easily, and further, a sound is used to attract an operator's attention more easily. Needless to say, when a sound is used in the first display form, the second display form requires the use of a sound increased in volume, for example, so that the user can notice it more easily. Then, the program returns to the step S11. On the other hand, if no error flag was detected at the step S12, the program skips over the step S13 to a step S14.

At the step S14, it is determined again whether or not a media pack is loaded. If a media pack is not loaded, the program proceeds to a step S15, wherein the fact is displayed in the second display form (i.e. in the display form using a mark or characters of a larger size and/or a sound for easier recognition). Then, the program returns to the step S14, wherein loading of a media pack is awaited.

If it was detected at the step S14 that a media pack is loaded, the program proceeds to a step S16, wherein a cap is removed from each ink pack in the media pack, and then a negative pressure nozzle is connected to each of the ink tanks for preliminary print operations including a recovery pumping operation. In the present embodiment, the preliminary operations are carried out after setting the print mode, so that wasteful consumption of electric power and ink can be significantly reduced, compared with a case where operations similar to those performed at the step S16 are carried out when a media pack is loaded or when the main power source of the camera is turned on.

Then, the program proceeds to a step S17, wherein depression of a print button is awaited. When the button is depressed, the program proceeds to a step S18, wherein the sheet feed roller is driven, thereby feeding a single print medium, such as paper sheets, from the media pack. Then, the program proceeds to a step S19, wherein the number of paper sheets as the print medium stored in the memory within the media pack is decremented by 1. Then, at a step S20, linear matrix conversion of print colors is performed by using the coefficient data of the color correction matrix stored in the memory of the media pack. Characteristics of changes in respective ink colors (e.g. yellow, cyan, magenta) dependent on elapsed time (months and years (or days)) after refilling or production of the inks are measured in advance, and linear matrix coefficients (e.g. 3×3=9 matrix coefficients for use in matrix operation of data of yellow, cyan, magenta before correction) for correcting the change characteristics are stored in the memory within the media pack in the form of a lookup table. Alternatively, as described hereinbefore, a plurality of lookup tables are stored in the lookup table appearing in FIG. 12, and data for enabling selection of one of the tables according to the degree of degradation of the inks is stored in the EEPROM 224, the memory within the camera section, or the memory within the printer section. Therefore, when the number of the elapsed months or years (or days) after refilling of the media pack with the inks is determined at the step S9, optimal printing can be performed by using ink colors whose characteristics of change were corrected according to the number of the elapsed months or years (or days). Although in the above embodiment and an embodiment described hereinafter, the date data information includes information of day, month and year and time information, it goes without saying that the date data information is not necessarily required to include information of time and day, but the date data information may be any time information such as year information alone, month and year information, day, month and year information, or information containing all of month, year, day, hour, minute, and second.

Then, the program proceeds to a step S21, wherein it is determined whether or not the remaining number of paper sheets as the print medium updated at the step S19 is equal to zero. If the remaining number is equal to zero, the program proceeds to a step S22, wherein error information indicative of the fact as error information is written to the memory within the media pack together with an error flag. Further, a date (day, month, year, (time, if required)) determined by the clock TM within the camera section at this time point is also stored in association with the error information, followed by the program proceeding to a step S23 in FIG. 18. On the other hand, if the remaining number of the print medium sheets is not equal to zero, the program skips over the step S22 to the step S23.

At the step S23, a print operation is started, and at the following step S24, it is detected by the acceleration sensor 109 whether or not a camera shake is larger than a predetermined amount. If the camera shake is larger than the predetermined amount, the program proceeds to a step S25, wherein the print operation is temporarily suspended. In this case, the printer section B100 is controlled such that the print operation is temporarily suspended with the carriage 225 in the printer section B100 being positioned at a main scanning end. The print operation is held in this state until the camera shake is reduced. Consequently, when the print operation is resumed after reduction of the camera shake, there occurs no conspicuous printing shift.

If the camera shake is equal to or smaller than the predetermined amount at the step S24, the program proceeds to a step S26, wherein it is determined whether or not the print operation is temporarily halted. If the print operation is in a temporary halt, the print operation is resumed, followed by the program proceeding to a step S28, whereas if the print operation is not temporarily halted, the program skips over the step S27 to the step S28. At the step S28, it is determined whether or not printing on one sheet has been completed. If the printing has not been completed, the program returns to the step S24. If the printing has been completed, the program proceeds to a step S29, wherein data of the remaining quantity of ink within the memory in the media pack is updated. More specifically, the data is updated to a value obtained by subtracting an ink jet amount (which is obtained not by measuring the amount of ink actually ejected, but by calculating the amount of each color ink to be used based on image data, by arithmetic operation) and the amount of ink sucked into the auxiliary tank within the recording head 207 (which is set to a substantially fixed amount) from data of the ink remaining amount stored in the memory within the media pack.

Next, the program proceeds to a step S30, wherein it is determined whether or not any one of the color inks has been used up (which means not only a state of the remaining amount thereof being reduced to zero, but also a state of the remaining amount being smaller than a predetermined amount). If any one of the color inks has been used up, the program proceeds to a step S31, wherein error information indicative of the fact is written, together with the error flag. At the same time, the date (day, month, year (and time, if required)) determined by the clock TM of the camera section at this time point is also stored in association with the error information.

At a step S32, it is determined whether or not there has occurred any abnormality (such as a failure caused by abortion of printing e.g. due to a camera shake or a big vibration, an inability to print a specific color e.g. due to clogging of the recording head, or the like) in the present print operation. If no abnormality has occurred, the program proceeds to a step S33, wherein information indicative of success of printing is written to the memory within the media pack, together with the date (hour) determined by the clock TM within the camera section at this time point in association with the information. Then, the fact that the printing has been normally completed is displayed on the LCD 106 at the following step S34, followed by the program returning to the step S11.

On the other hand, if occurrence of any abnormality in the printing operation was detected at the step S32, the program proceeds to a step S35, wherein information indicative of the abnormality is written to the memory within the media pack. At the following step S36, an error flag is stored in the same, and the date (day, month, year (and time)) determined by the clock TM within the camera section at this time point is also stored in association with the error information and error flag. Then, at a step S37, the error information is displayed on the LCD 106, followed by the program returning to the step S11.

As described above, according to the present embodiment, information indicative of a detected one of various kinds of errors is stored in the memory within the media pack in association with a date (day, month, year, and time) determined by the clock TM within the camera section. Therefore, in the case of recovering the media pack later or in the case of using the same repeatedly, it is possible to carry out repair of the media pack or correction of data properly. Moreover, it is also possible to collect information for improvement of a media pack.

Figure 19:
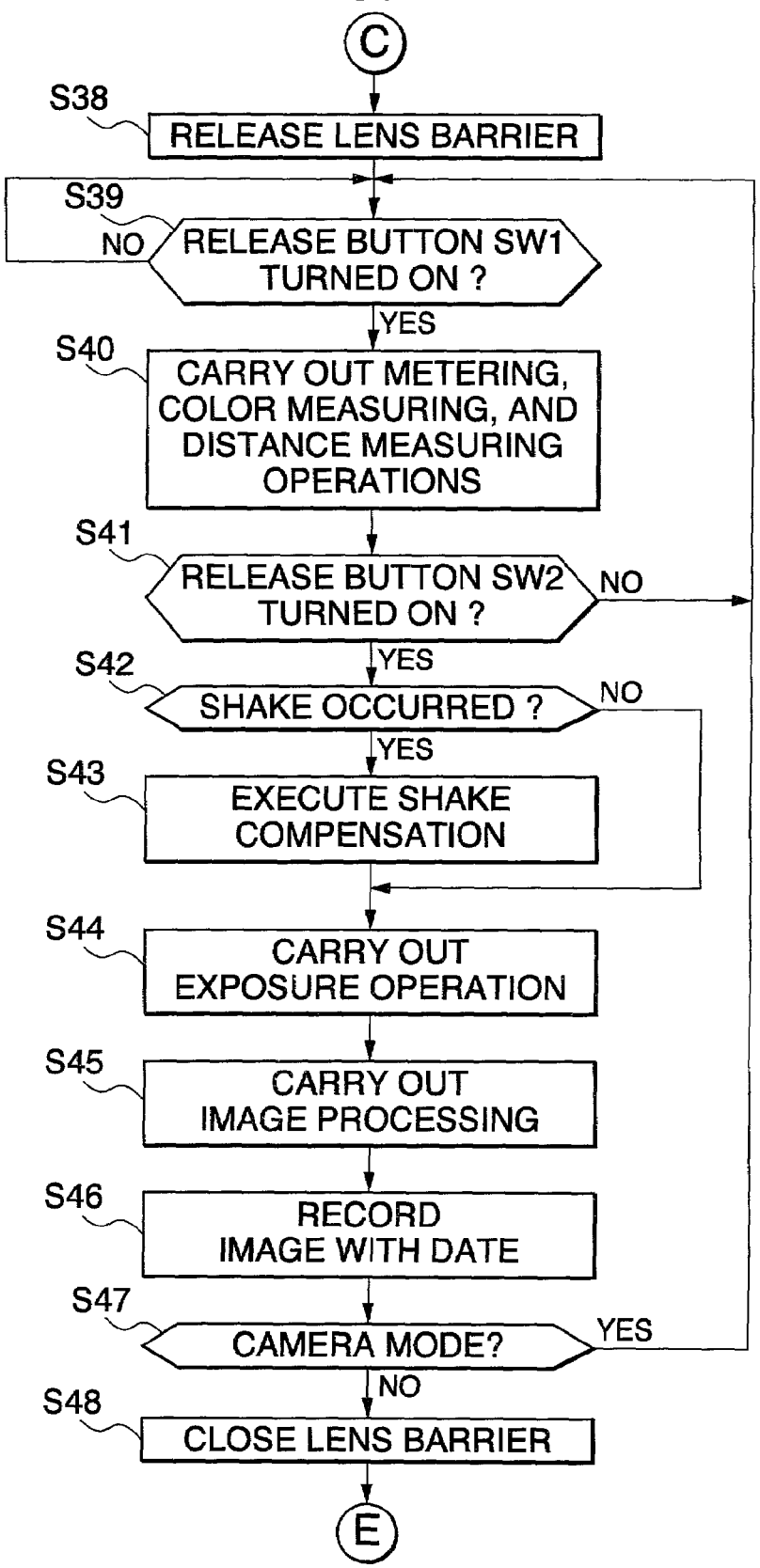
FIG. 19 is a continued part of the flowchart.

If it is determined at the step S11 (FIG. 17) that the present mode is not the printer mode but the camera mode, the program proceeds to step S38 in FIG. 19, wherein a lens barrier, not shown, arranged on the front of the lens 107 is released by a plunger. Then, at the following step S39, depression of the release button into a first stroke position, which means that the SW 1 is turned on, is awaited. When the SW 1 of the release button is turned on, the program proceeds to a step S40, wherein measuring operations, such as a metering operation, a color measuring operation, and a distance measuring operation, are carried out.

Then, the program proceeds to a step S41, wherein depression of the release button into a second stroke position, which means that the SW 2 is turned on, is awaited. When the SW 2 is not turned on, the program returns to the step S39, whereas when the SW 2 is turned on, the program proceeds to a step S42. At the step S42, a shake amount and a shake direction are detected based on the output from the acceleration sensor 109, and then it is determined whether or not there is a camera shake, dependent on whether the detected shake amount is larger than a predetermined amount. If there is a camera shake, at a step S43, the shake compensation mechanism 108 is operated according to the shake amount and the shake direction to thereby correct a shift of the image, and then the program proceeds to a step S44. On the other hand, if there is no camera shake, the program skips over the step S43 to the step S44.

At the step S44, an exposure operation is carried out by controlling an aperture and a shutter, whereby the CCD 101 is exposed to a predetermined amount of light. Then, the program proceeds to a step S45, wherein image processing operations, such as white-balance calibration, gamma correction, color correction and compression, are performed, and at a step S46, the image is stored in the CF card 105. At the same time, information of a date determined by the clock TM within the camera section at this time point is also stored in association with the image.

Then, the program proceeds to a step S47, wherein it is determined whether or not the present mode is the camera mode. If the present mode is the camera mode, the program returns to the step S39, whereas if not, the program returns to the step S11 after closing the lens barrier at a step S48.

(Another Embodiment)

Figure 21:
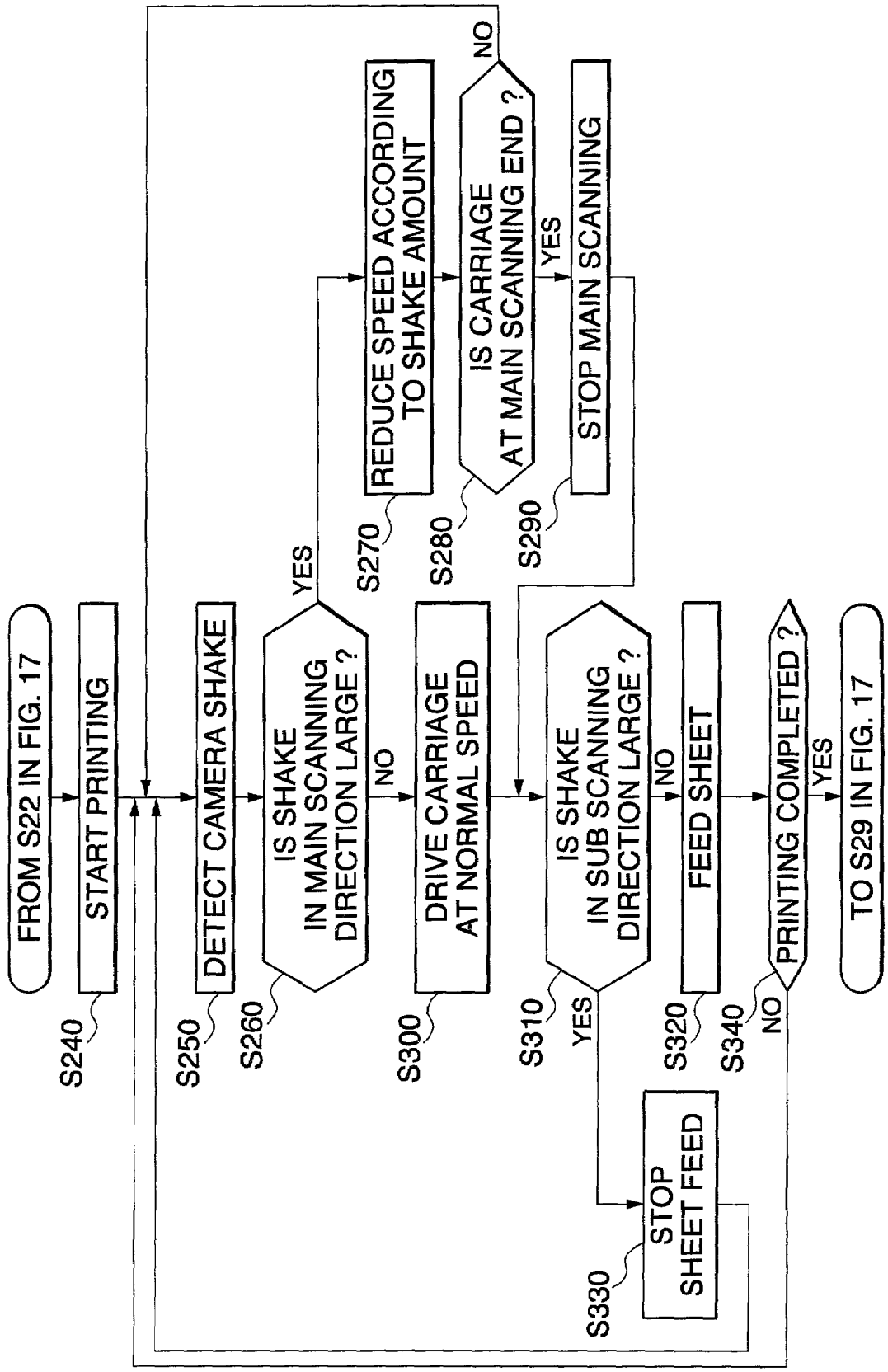
FIG. 21 is a flowchart showing an operating procedure of a camera with a printer, according to another embodiment of the invention.

A second embodiment of the present invention will be described with reference to FIG. 21. FIG. 21 is a flowchart which shows an operating procedure of the camera with a printer, according to the second embodiment.

The present embodiment is distinguished from the above described embodiment in that in carriage control executed by using the acceleration sensor 109, the running speed of the carriage 225 and sheet feed are controlled according to the amount of a camera shake in a predetermined direction.

More specifically, as shown in FIG. 21, a print operation is started at a step S240 (corresponding to the step S23 in FIG. 18), and at the following step S250, a shake amount and a shake direction are detected by the acceleration sensor 109. Then, at a step S260, a shake component amount in the main scanning direction is calculated from the detected shake amount and direction, and it is determined whether or not the shake component amount is larger than a predetermined amount. If the shake component amount in the main scanning direction is larger than the predetermined amount, the program proceeds to a step S270, wherein the present running speed of the carriage 225 is reduced according to the shake component amount in the main scanning direction. More specifically, a deceleration amount by which the carriage 225 is to be decelerated is set according to the shake component amount in the main scanning direction, and the running speed of the carriage 225 is controlled according to the set deceleration amount. In this case, if the shake component amount is medium, a smaller deceleration amount is set to thereby minimize a decrease in printing efficiency. On the other hand, if the shake component amount is large, a larger deceleration amount is set to limit the influence of the shake on deviation of the scanning speed within a predetermined range, thereby reducing an error in a hitting position of ink ejected onto a paper sheet from the recording head 207 to an amount which is equal to or smaller than a predetermined amount.

Then, the program proceeds to a step S280, wherein the present position of the recording head 207 is detected, and it is determined whether or not the recording head is at the main scanning end. If the recording head is not at the main scanning end, the program returns to the step S250, wherein a shake amount is detected again. On the other hand, if the recording head is at the main scanning end, the program proceeds to a step S290, wherein the carriage 225 is temporarily stopped, and thereby temporarily suspending the main scanning. Then, the program proceeds to a step S310, wherein a shake component in the sub-scanning direction is determined from a shake amount, and it is determined whether or not the shake component is larger than a predetermined amount.

If the shake component in the sub-scanning direction is larger than the predetermined amount at the step, the program proceeds to a step S330, wherein sheet feed is stopped. Then, the program returns to the step S250, wherein a shake amount is detected again. On the other hand, if the shake component in the sub-scanning direction is equal to or smaller than the predetermined amount at the step S310, the program proceeds to a step S320, wherein the paper sheet is fed by a predetermined amount. Then, at the following step S340, it is determined whether or not printing on one sheet has been completed according to whether or not the recording position has reached a sub-scanning end. If the recording position has not reached a sub-scanning end, which means that printing has not been completed, the program returns to the step S250, wherein a shake amount is detected again.

If the shake component amount in the main scanning direction is equal to or smaller than the predetermined amount at the step S260, the program proceeds to a step S300, wherein the carriage 225 is driven at a normal speed. In other words, the main scanning is carried out at the normal speed. If the running speed of the carriage 225 is being currently decelerated, the running speed is increased again to the normal speed. Thereafter, at steps S310 to 330, sheet feed is stopped or continued according to the shake amount in the sub-scanning direction.

Figure 18:
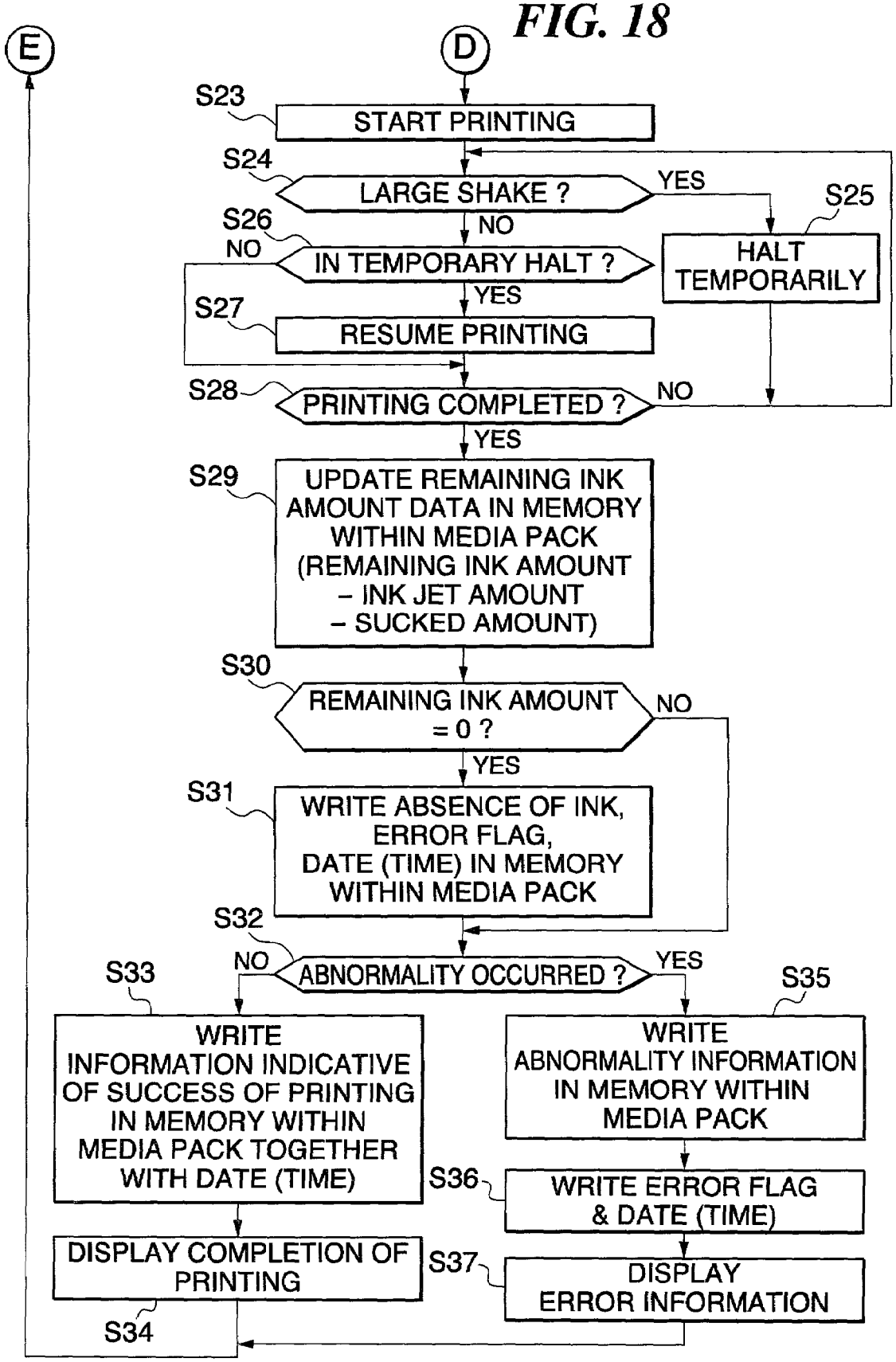
FIG. 18 is a continued part of the flowchart.

When it is determined at the step S340 that the printing on one sheet is completed, the program returns to the step S29 in FIG. 18, and then the steps S29 et seq. are repeatedly carried out.

Although in the above described embodiments, the camera is comprised of the camera section A100 and the printer section B100 which are integrated in a one-piece body, this is not limitative, but even when the camera section A100 and the printer section B100 are formed in two separate bodies, which are interconnected via the interface 210, it is possible to realize similar functions to those described above.

What is claimed is:

1. A printer comprising:
a mounting mechanism capable of removably mounting a media pack comprising a pack body containing ink and a print medium for use in printing, and a memory capable of storing data related to the print medium, the data including at least first information of a year and month at which print medium was filled or produced, and second information of a year and month at which the ink was filled or produced;
a detector capable of detecting an elapsed time period based on said first information read out from said memory;
an acquisition circuit capable of acquiring characteristic change third information relating to a change in characteristics of the ink dependent on a time period elapsed after the filling or producing of the ink; and
an image processing circuit capable of executing image processing of image data, by using coefficients, and a coefficient-changing circuit capable of changing the coefficients used in the image processing, based on the third information.

2. A camera with a printer comprising:
a printer;
an image sensor capable of picking up an image;
a timer capable of setting date information;
a recorder capable of recording the image picked up by said image sensor, in association with the date information set by said timer;
a mounting mechanism capable of removably mounting a media pack containing at least one kind of consumable article for use in printing by said printer and including a memory capable of storing at least first information of a year and month at which the consumable article was filled or produced;
a detector capable of detecting a time period elapsed after the filling or producing of the consumable article, based on the first information stored in said memory and the date information set by said timer;
an acquisition circuit capable of acquiring third information relating to a change in characteristics of the consumable article dependent on a time period elapsed after the filling or producing of the consumable article; and
an image processing circuit capable of executing image processing of image data, by using coefficients, and a coefficient-changing circuit capable of changing the coefficients used in the image processing, based on the acquired third information.

3. A printer comprising:
a mounting mechanism capable of mounting a media pack including a pack body containing at least one kind of consumable article for use in printing, and a memory arranged within said pack body, the memory being capable of storing data relating to information indicative of a change in characteristics of the consumable article dependent on a time period elapsed after filling or producing of the consumable article;
an acquisition circuit for acquiring the information from said memory of the media pack; and
an image processing circuit capable of executing image processing of image data by using coefficients, and a coefficient-changing circuit capable of changing the coefficients used in the image processing, based on the acquired information.

4. A camera with a printer comprising:
a camera body;
a printer integrally combined with said camera body;
a shake sensor capable of detecting a shake of said camera body;

a correction circuit capable of correcting a blur of a captured image according to an output from said shake sensor; and a controller for controlling operation of said printer according to the output from said shake sensor at the time of a printing operation;

wherein said printer includes a recording head reciprocally movable in a scanning direction, and wherein the camera includes a head position sensor capable of detecting a position of said recording head, and wherein said controller stops a scanning operation of said recording head at a predetermined scanning position according to the output from said shake sensor.

* * * * *